United States Patent
Walls

(10) Patent No.: US 9,789,408 B2
(45) Date of Patent: Oct. 17, 2017

(54) SYSTEMS AND METHODS FOR MULTI-SOURCE ARRAY PROCESSING

(71) Applicant: Funkitron, Inc., Boxford, MA (US)

(72) Inventor: David Walls, Boxford, MA (US)

(73) Assignee: Funkitron, Inc., Boxford, MA (US)

( * ) Notice: Subject to any disclaimer, the term of this patent is extended or adjusted under 35 U.S.C. 154(b) by 0 days.

(21) Appl. No.: 15/273,331

(22) Filed: Sep. 22, 2016

(65) Prior Publication Data

US 2017/0007930 A1 Jan. 12, 2017

Related U.S. Application Data

(63) Continuation-in-part of application No. 15/089,074, filed on Apr. 1, 2016, which is a continuation of application No. 14/182,026, filed on Feb. 17, 2014, now Pat. No. 9,333,421.

(60) Provisional application No. 61/766,283, filed on Feb. 19, 2013.

(51) Int. Cl.
*A63F 13/822* (2014.01)
*A63F 13/45* (2014.01)
*A63F 13/20* (2014.01)
*A63F 13/40* (2014.01)

(52) U.S. Cl.
CPC ............ *A63F 13/822* (2014.09); *A63F 13/10* (2013.01); *A63F 13/20* (2014.09); *A63F 13/45* (2014.09); *A63F 2300/308* (2013.01); *A63F 2300/6036* (2013.01); *A63F 2300/61* (2013.01)

(58) Field of Classification Search
USPC ................................................ 463/6, 7, 8, 9
See application file for complete search history.

(56) References Cited

U.S. PATENT DOCUMENTS

| | | |
|---|---|---|
| 2005/0215311 A1 | 9/2005 | Hornik et al. |
| 2005/0288094 A1 | 12/2005 | Marks et al. |
| 2007/0205556 A1 | 9/2007 | Roemer et al. |
| 2009/0124325 A1* | 5/2009 | Wadleigh ............... G07F 17/34 463/20 |
| 2010/0259006 A1 | 10/2010 | Factor |
| 2013/0331162 A1 | 12/2013 | Krivicich |

(Continued)

OTHER PUBLICATIONS

Cardwell-Winters, Kellie: "Gems With Friends Walkthrough Cheats and Strategy Guide; Gamezebo", Sep. 10, 2010, XP055120149, Retrieved from the Internet: URL:http://www.gamezebo.com/games/gems-friends/walkthrough-cheats-strategy-guide [retrieved on May 26, 2014].

(Continued)

*Primary Examiner* — Dmitry Suhol
*Assistant Examiner* — Brandon Gray
(74) *Attorney, Agent, or Firm* — Foley & Lardner LLP; Daniel Rose; Christopher J. McKenna

(57) ABSTRACT

The present disclosure is directed to methods and systems for processing replacements to a target array by a plurality of source arrays. Selected tokens in a target array may be replaced with corresponding tokens from a source array to generate a region of identical tokens, which may be processed or removed. Tokens in the target array may be shifted in a direction corresponding to the source array to fill empty cells within the target array and new tokens generated. Selections may be made from multiple source arrays iteratively, with shift directions dynamically modified.

20 Claims, 20 Drawing Sheets

(56) References Cited

U.S. PATENT DOCUMENTS

2014/0080560 A1 3/2014 Knutsson
2014/0370950 A1 12/2014 Hansson et al.

OTHER PUBLICATIONS

CN Office Action in CN Appl. No. 201480021612.7, dated Nov. 3, 2015.
International Preliminary Report on Patentability dated Sep. 3, 2015 in PCT Application No. PCT/US2014/016708.
International Search Report and Written Opinion for PCT/US2014/016708, dated Jun. 11, 2014.
U.S. Notice of Allowance for U.S. Appl. No. 14/182,026, dated Mar. 8, 2016.
U.S. Office Action for U.S. Appl. No. 14/182,026, dated Nov. 3, 2014.
U.S. Office Action for U.S. Appl. No. 14/182,026, dated May 22, 2014.
U.S. Office Action on U.S. Appl. No. 14/182,026, dated May 11, 2015.
Wikipedia: "Qwirkle—Wikipedia, the free encyclopedia", Dec. 30, 2010 (Dec. 30, 2010), XP055120152, Retrieved from the internet: URL:https://web.archive.org/web/20101230204819/http://en.wikipedia.org/wiki/Qwirkle [retrieved on May 26, 2014].
Wikipedia: "SameGame—Wikipedia, the free encyclopedia", Sep. 16, 2012 (Sep. 16, 2012), XP055120482, Retrieved from the Internet: URL:http//en.wikipedia.org/w/index.php?title=SameGame&oldid=512982586 [retrieved on May 27, 2014].
U.S. Office Action for U.S. Appl. No. 15/089,074 dated Jun. 23, 2017.

\* cited by examiner

SYSTEMS AND METHODS FOR MULTI-SOURCE ARRAY PROCESSING

RELATED APPLICATIONS

This application claims the benefit of and priority as a continuation-in-part of U.S. Non-Provisional Application Ser. No. 15/089,074, entitled "Systems and Methods for a Token Match Game," filed Apr. 1, 2016; which claims the benefit of and priority as a continuation to U.S. Non-Provisional Application Ser. No. 14/182,026, entitled "Systems and Methods for a Token Match Game," filed Feb. 17, 2014; which claims priority to U.S. Provisional Application No. 61/766,283, entitled "Systems and Methods for a Token Match Game," filed Feb. 19, 2013; the entirety of each of which are hereby incorporated by reference.

FIELD OF THE DISCLOSURE

The present disclosure relates to systems and methods for processing replacements to a target array by a plurality of source arrays.

BACKGROUND OF THE DISCLOSURE

Processing and replacement of contents of an array with contents of a second array typically apply processing rules in a predetermined direction, such as top to bottom. For example, upon removal of a plurality of tokens within an array, typical systems may iteratively move or "slide" existing tokens within the array downwards from higher numbered rows to lower numbered rows (when counted upwards from the bottom of the array). These systems may lack flexibility or the ability to applying iterative shifts in other directions.

BRIEF SUMMARY OF THE DISCLOSURE

An improved system may provide for iterative shifts of tokens within an array in a direction corresponding to a second array positioned relative to the first. For example, given a second array positioned below the first array, tokens in the first array may be slid or iteratively shifted downwards into empty cells of the first array. Given a third array positioned above the first array, tokens in the first array may be slid or iteratively shifted upwards into empty cells of the first array. Similarly, tokens may be slid horizontally towards or away from columnar arrays bordering the first array. This provides additional functionality to the array processor, and may, in many implementations, reduce a memory footprint compared to duplicating and inverting the array.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
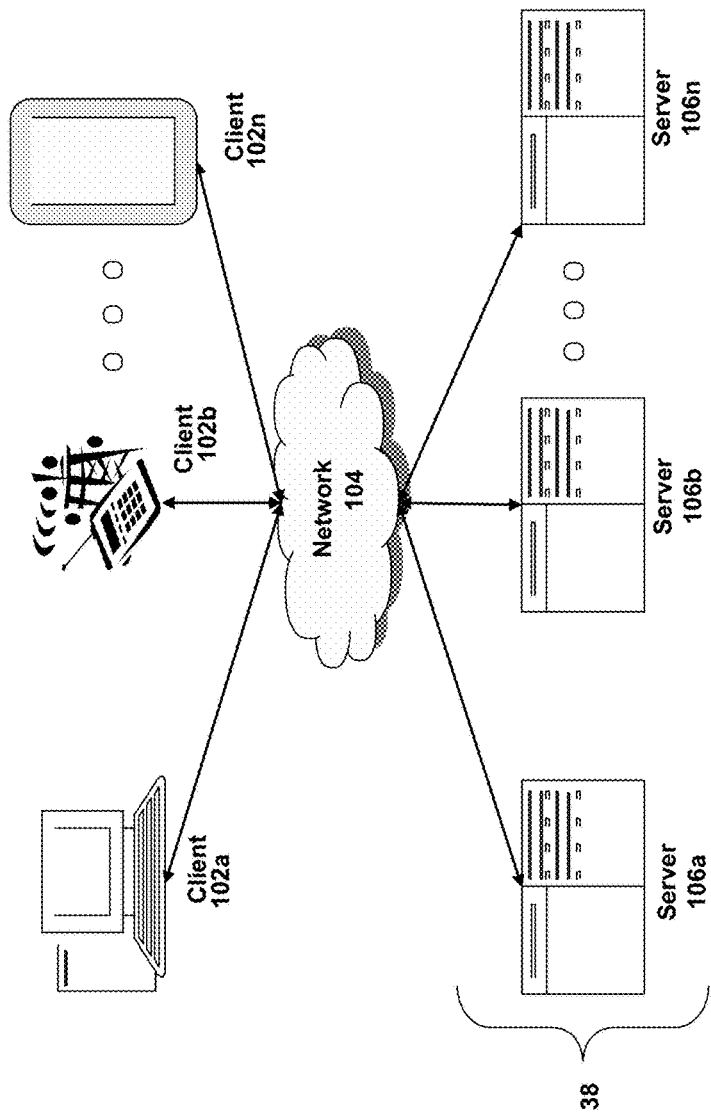
FIG. 1A is a block diagram depicting an embodiment of a network environment comprising client devices in communication with server devices.

Prior to discussing specific embodiments of the present solution, it may be helpful to describe aspects of the operating environment as well as associated system components (e.g., hardware elements) in connection with the methods and systems described herein. For example, these system components may be used to provide a multi-source array processing system to a client device for execution; or for other social networking functions discussed in more detail below. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
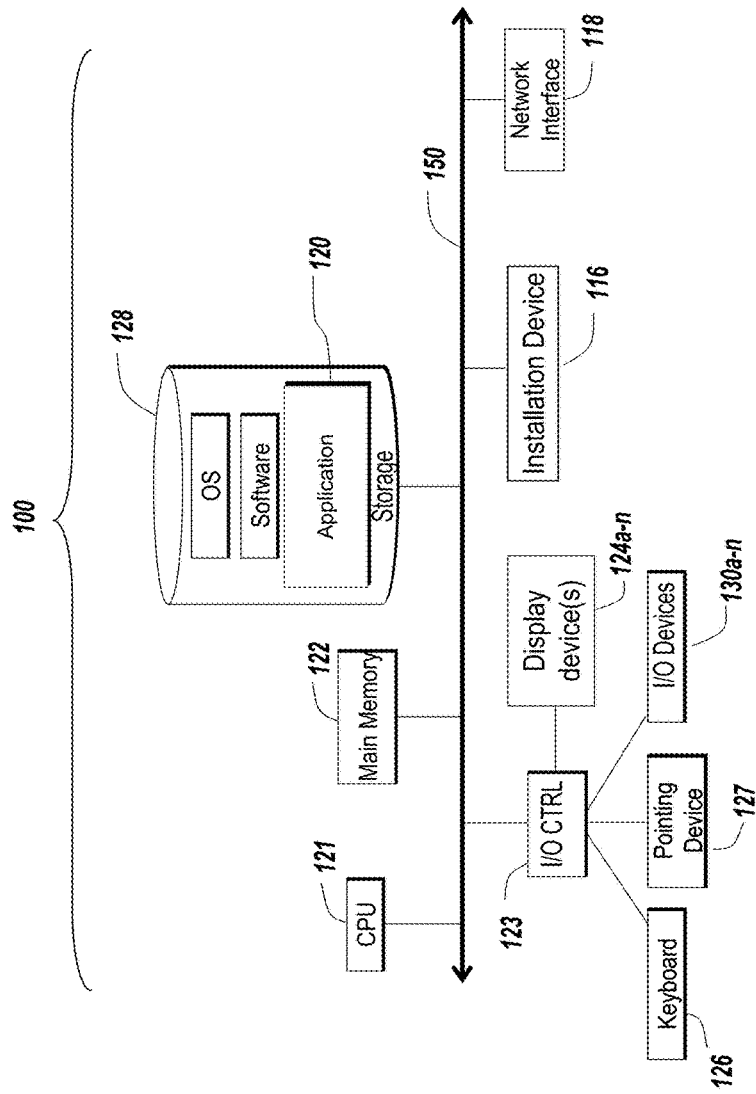
FIGS. 1B and 1C are block diagrams depicting embodiments of computing devices useful in connection with the methods and systems described herein.
Figure 1C:
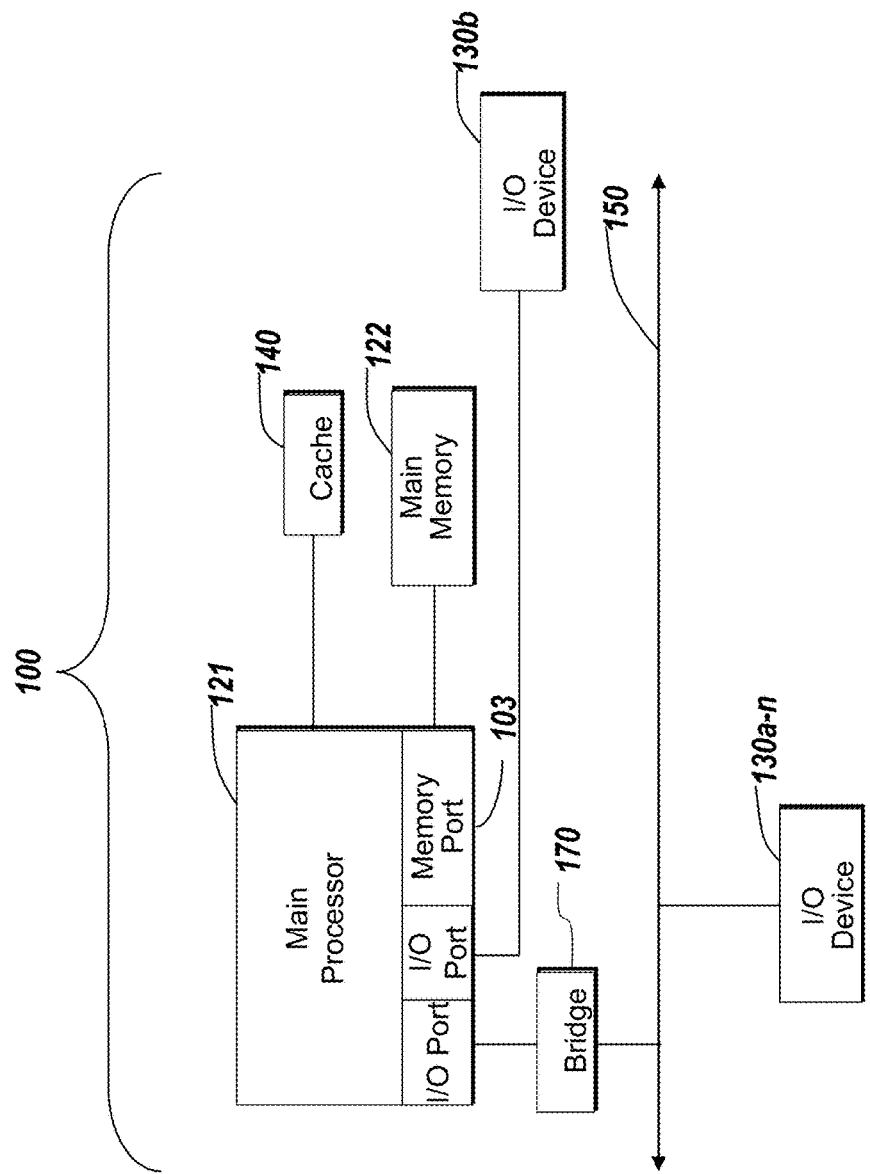

The client 102 and server 106 may be deployed as and/or executed on any type and form of computing device, e.g. a computer, network device or appliance capable of communicating on any type and form of network and performing the operations described herein. In many embodiments, the client 102 may comprise an Apple IPHONE smart phone, an Apple IPAD tablet computer, an Android operating system-based smart phone or tablet such as a Samsung Galaxy Tab, or any other such device including desktop computers, laptop computers, tablet computers, smart phones, or other devices. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B. a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and an array processor 120. As shown in FIG. 1C, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124.

Figure 1D:
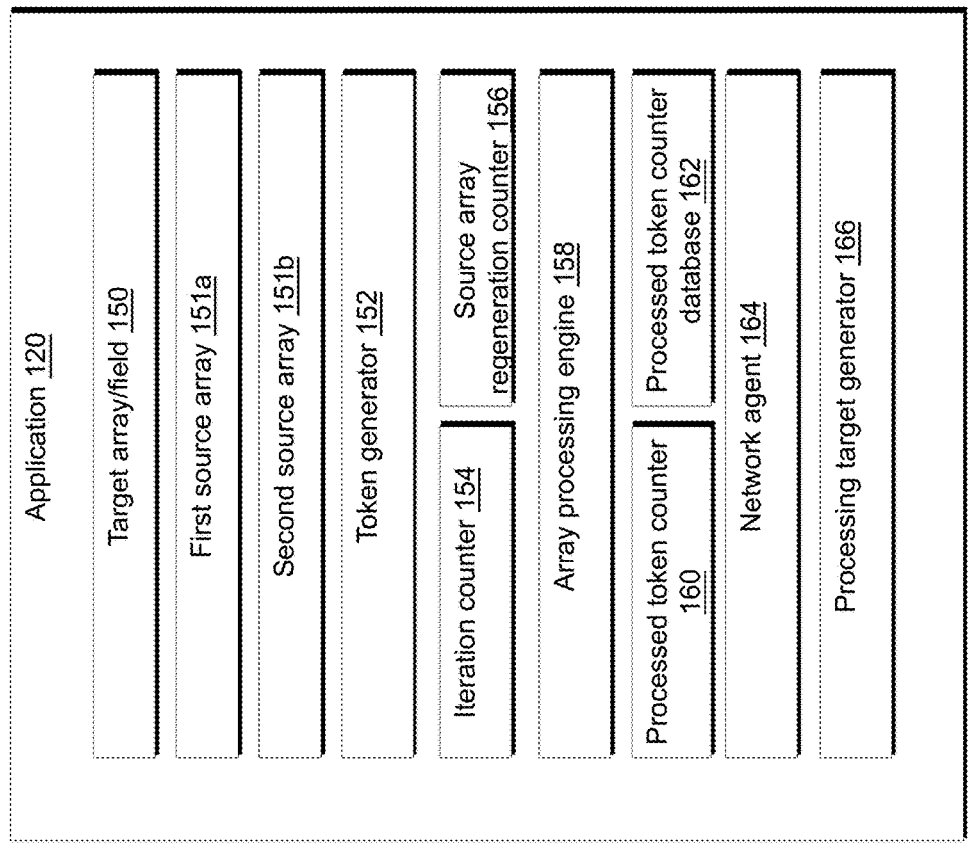
FIG. 1D is a block diagram of an embodiment of a system for processing of arrays.

FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, and may include discrete computing devices acting as an input or output devices, such as an Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1B. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1B, the computing device 100 may comprise a storage device 128 (e.g. one or more hard disk drives or redundant arrays of independent disks) for storing an operating system or other related software, and for storing application software programs such as any program related to the token match game software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Other storage devices 128 may be external and connect to the computing device 100 via a I/O device 130 that provides an external bus. Still other storage devices 128 may connect to the computing device 100 via the network interface 118 over a network 104, including, e.g., the Remote Disk for the MACBOOK AIR by Apple. Some client devices 100 may not require a non-volatile storage device 128 and may be thin clients or zero clients 102. Some storage devices 128 may also be used as a installation device 116, and may be suitable for installing software and programs. In some implementations, the operating system and the software can be run from a bootable medium, for example, a bootable CD, e.g. KNOPPIX, available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, cellular connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player.

For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Referring now to FIG. 1D, illustrated is a block diagram of an embodiment of an array processing application 120. An array processing application 120 may comprise an application, applet, routine, game engine, or other executable logic for processing and replacing tokens in an array based on a selection by a user associated with a second array corresponding to a side of the first array, and may be variously referred to as an array processor, a token replacer, or by any other such term. In some implementations, the array processing application 120 may be used for an array processor, token match game, or game engine; a transaction processor; a cryptographic processor; or any other such usage. In many embodiments, an array processing application 120 may be purchased, downloaded, and installed via an online application store such as the Apple App Store or Google Play. In other embodiments, an array processing application 120 may be presented as a web application in Flash, Java, HTML5, or any other such programming language. In some embodiments, an array processing application 120 may be programmed in a cross-platform language, such as Unity by Unity Technologies of San Francisco, Calif., and may be available in several formats.

In brief overview, an array processing application may comprise or manipulate a target array or field 150, and one or more source arrays (e.g. a first source array 151a and a second source array 151b), discussed in more detail below. The array processing application 120 may also comprise a token generator 152 for generating or selecting tokens to fill the two arrays. In some embodiments, the array processing application 120 may comprise an iteration counter 154 for counting a number of iterations or rounds available to discard and refresh unused contents of a source array, and/or a source array regeneration counter 156 for storing a value corresponding to a number of times a source array has been emptied. In some embodiments, the array processing application 120 may comprise a rules engine 158 for identifying adjacent matching tokens or array clearances. In some embodiments, the array processing application 120 may include a processed token counter 160 for keeping track of a number of tokens replaced or removed from the target array, as well as a processed token database 162 for retaining previous token counts. The array processing application 120 may include a network agent 164 for communicating with social networking services or email for communicating a processing result to or from other users or devices; or for receiving application updates. In some embodiments, the array processing application may include a processing target generator 166 for dynamically generating a target processing goal (e.g. number of tokens to remove). In other embodiments, the array processing application may have one or more predetermined goals, which may be selected by a user. Goals may vary in complexity, based on different sizes or shapes of arrays; different numbers of iterations or rounds of processing allowed; different target goals; different numbers of token types; the presence or absence of tokens having special features or properties; or any other such feature.

Still referring to FIG. 1D and in more detail, in some embodiments, an array processing application 120 may comprise a target array or field 150. Target array 150 may comprise an array, data table, database, or other data format for identifying tokens in one or more arrays. Referring to FIGS. 2A-2D, illustrated are diagrams illustrating successive steps of token selection, replacement, and scoring in an embodiment of an array processing application 120. As shown, the target array 150 may comprise a first array 202 and may be associated with or bordered by a second array 204 or source array 151a. The first array 202 may be referred to as a playing field, in-play field, or by similar terms, and may have a dimension of l×m. In some embodiments, as shown, l and m may be identical values and the array may be square, while in other embodiments, the array may be rectangular. In some embodiments, the array processing application 120 may have different modes including "small boards" and "large boards" with correspondingly different values of l and m, such as 6×7 for a "small" board and 7×8 for a "large" board. Other values and sizes may be used, as well as other relative descriptors, including "tiny", "normal", "big", "huge", or any other value. In some embodiments, a user may be able to specify a size of one or both of l and m.

The second array 204 may be referred to as a "hand", a source array 151, or by a similar term, and may have a dimension of l×n. Each cell in array 204 may correspond to a column or row of cells in first array 202 (depending on orientation of the second array 204 to the first array 202). For example, in implementations using the orientation shown, each cell in array 204 may correspond to a column of cells in first array 202, such that a user or processor may swap any token in the column of first array 202 with the token in the corresponding cell of second array 204.

As shown, each cell may include a token 206a-206e, which may be of any type and represent any entity and be visualized in various shapes and/or colors, referred to generally as token(s) 206. In some embodiments, tokens 206 may be referred to as "gems", "coins", "cards", "icons", "sprites", "items", or any other such identifier. Although shown as polyhedrons, tokens 206 may also comprise playing cards of different values such as jacks, queens, kings, and aces; alphanumeric icons; Greek letters or symbols; blocks of different colors and/or patterns; icons of different types of candy, foods, or animals; or any other type of distinct shapes, letters, colors, symbols, portraits, devices, or icons.

Figure 2A:
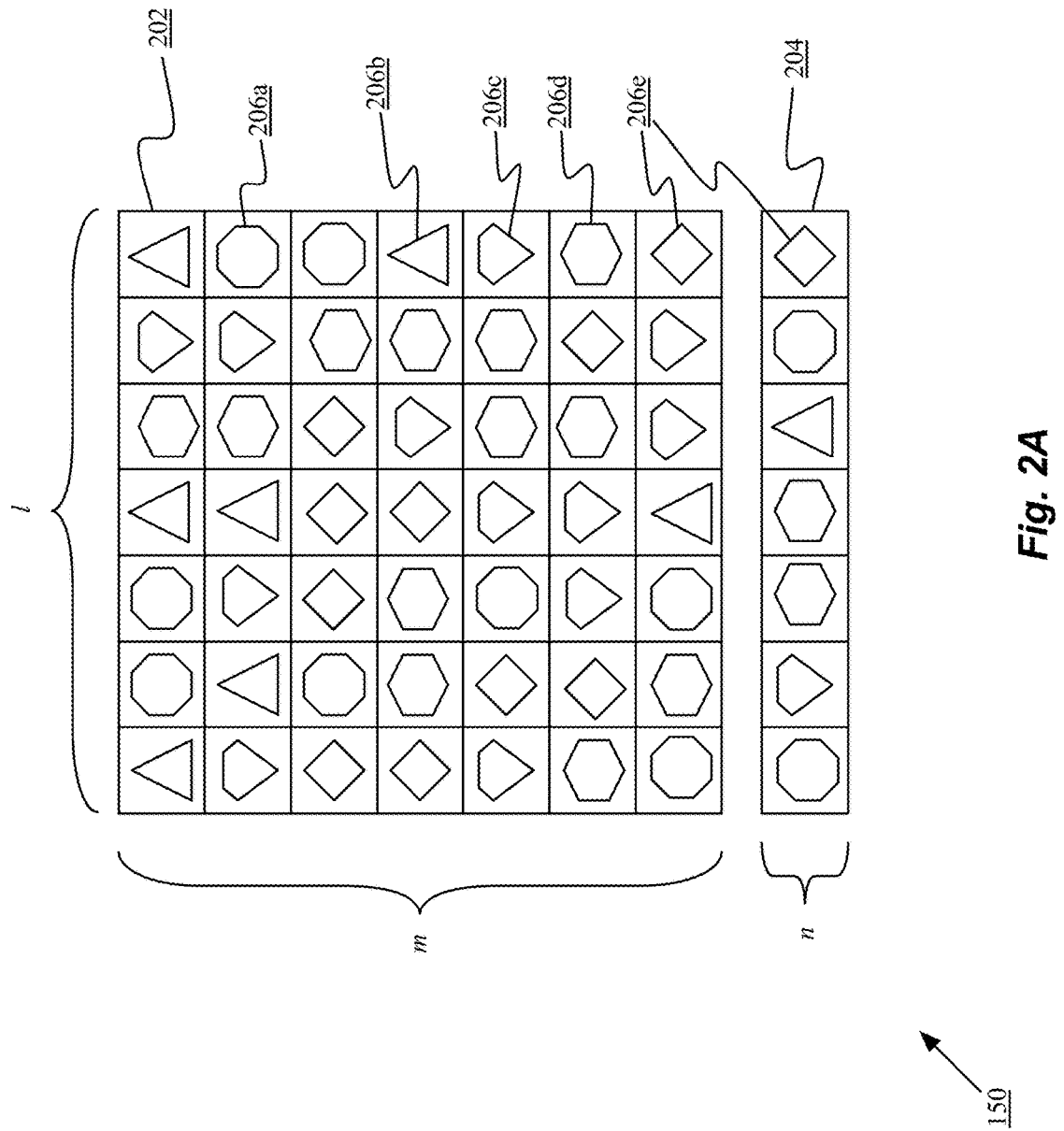
FIGS. 2A-2D are diagrams illustrating successive steps of token selection, replacement, and counter incrementing in an embodiment of a method for processing replacements to a target array from a source array.
Figure 2B:
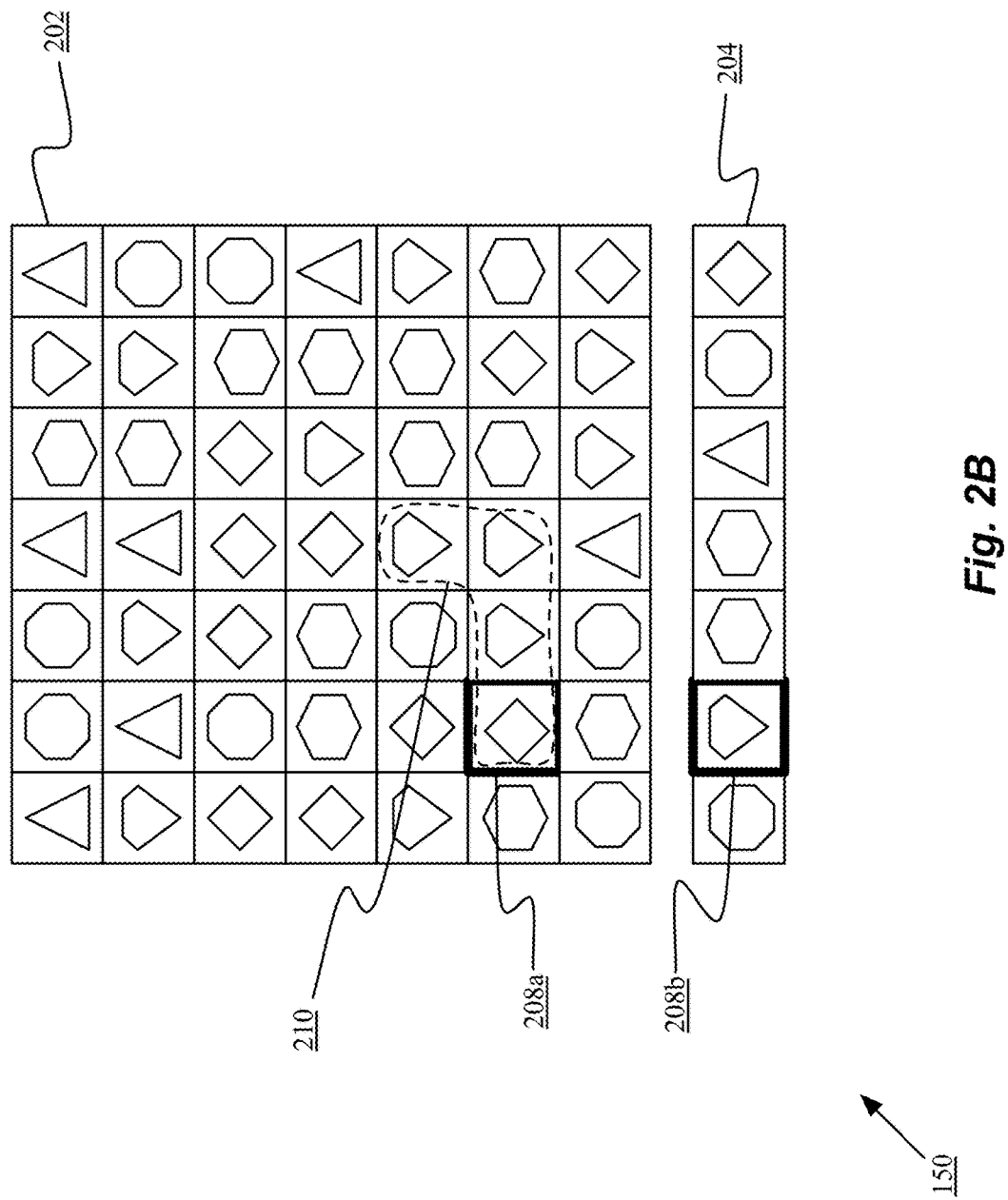
Figure 2C:
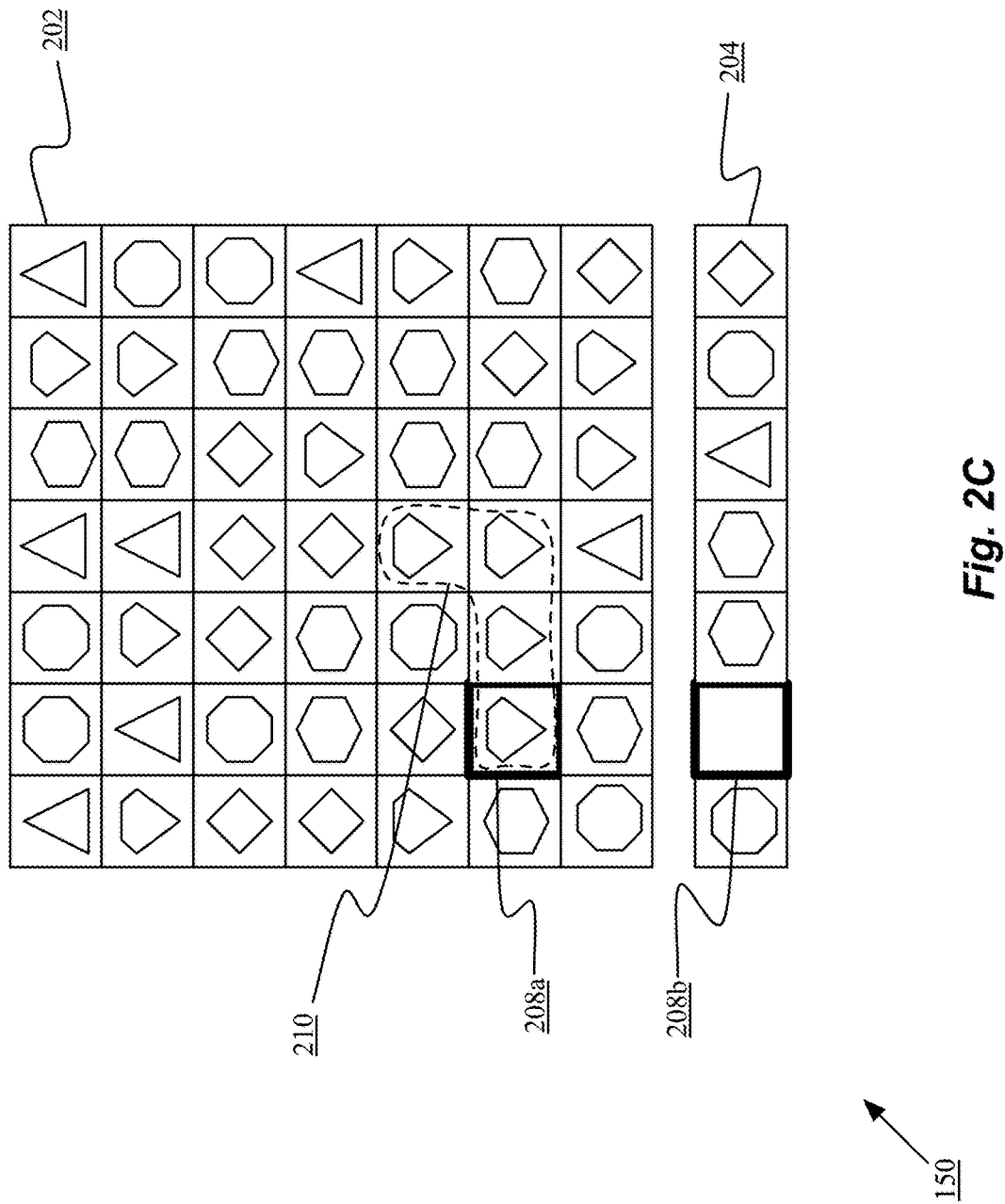

Referring now to FIG. 2B, during processing, a user may select a cell 208a of first array 202 (illustrated in bold line) to replace the token 206 within said cell 208a with a token in a corresponding cell 208b of second array 204 (illustrated in bold line). As discussed above, cell 208b may correspond to any cell in the corresponding column (or row, depending on orientation) of first array 202. By replacing the token 206 in cell 208a with the token 206 in cell 208b, the user may create a region 210 of adjacent identical tokens 206 (illustrated in dashed line) as shown in FIG. 2C. In some implementations, the user may freely replace any token in a cell 208a, while in other implementations, the user may only replace a token in a cell 208a if it results in creation of a region 210 of adjacent identical tokens. In many implementations, the region 210 may have a minimum size, such as three adjacent tokens, and the user may not replace the token in cell 208a if it results in creation of a region 210 of less than the minimum size.

Although shown as a non-linear region 210, in some embodiments or processing modes, the region 210 may be constrained to a single line. For example, in one such embodiment, a user may select a cell to replace with a token from a corresponding cell in the second array 204 and create a line of three adjacent or more tokens. These tokens may then be removed. Lines may be vertical, horizontal, or, in some embodiments, diagonal.

Figure 2D:
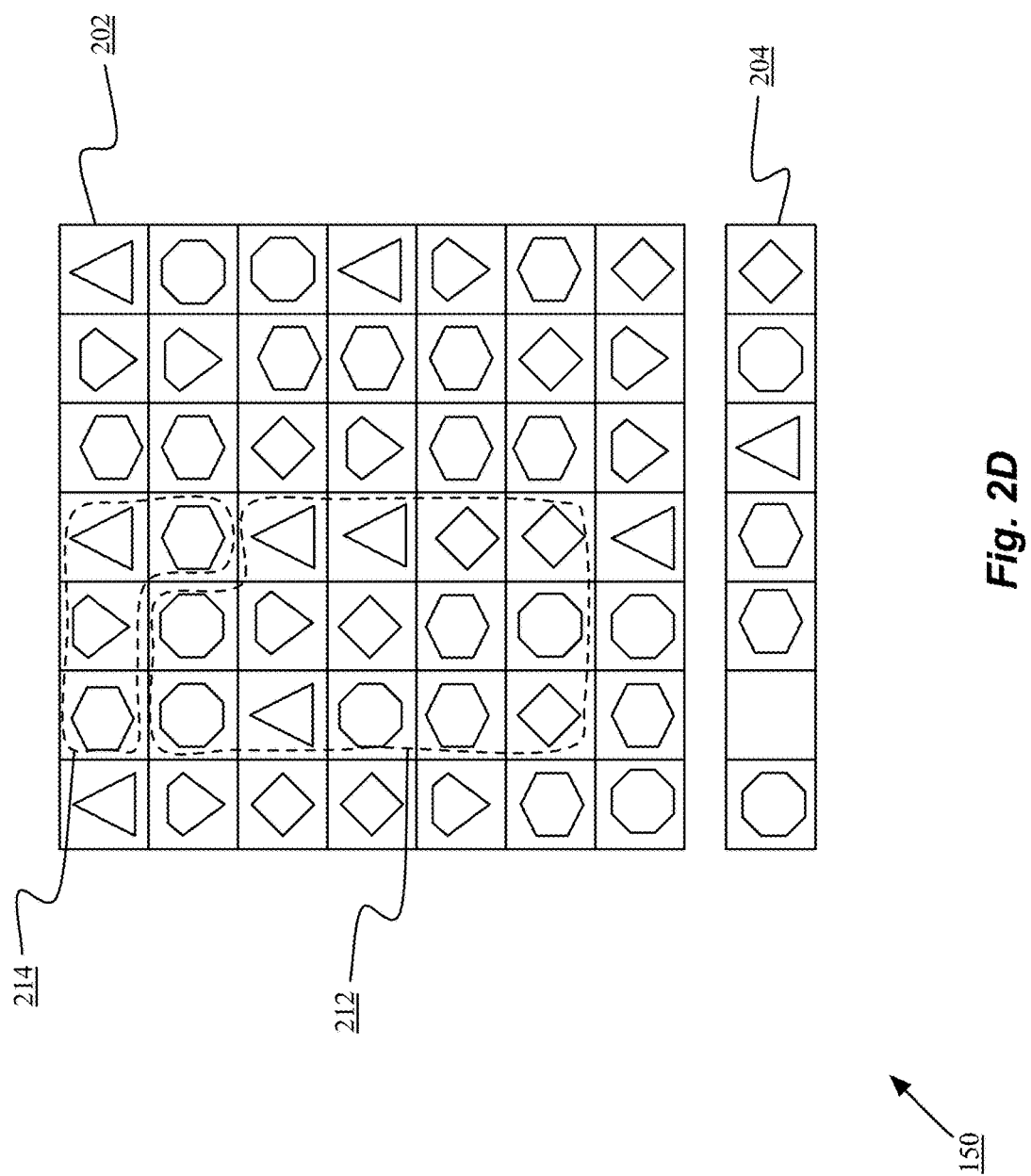

Once a region of adjacent identical tokens 210 has been created, the tokens within the region 210 may be removed and a processed token counter may be incremented. In some implementations, the processed token counter may be referred to as a score. In some embodiments, the user may receive a score of a predetermined value multiplied by the number of tokens within the region. For example, given a score value of 100, generating a region of five tokens may result in a score of 500, while generating a region of eight tokens may result in a score of 800. In other embodiments, the counter may be incremented by a predetermined value raised to a power of the number of tokens within the region, such as $2^n$. Other scoring values may be used, such as bonuses for generating a region of seven tokens. Once the tokens in region 210 are removed, resulting empty cells in array 202 may be filled in. In some embodiments, as shown in FIG. 2D, tokens in cells of positions above the region 210 in the array 202 may be lowered or slid downwards to fill the empty spaces (shown in dotted line as region 212). The resulting empty spaces may thus be raised to the top of the array (region 214 in dotted line), and new tokens 206 may be selected randomly to fill said empty spaces. This allows the user to apply some strategy through removal of tokens in lower spaces in the array to shift tokens in higher spaces into new adjacent regions. In many embodiments, tokens in the array may only be shifted in a single direction, e.g. downwards, as shown in FIG. 2D. In other embodiments, described in more detail below, tokens in the array may be shifted in two directions, e.g. downwards and sideways. As shown, in many embodiments, a cell 208b in second array 204 may not be filled in with a new token. In such embodiments, the user may be required to utilize all tokens in source array 204 before the source array is refilled with new tokens.

In some embodiments, the region 210 may be removed once per user selection. In other embodiments, after removal and shifting of other tokens to fill empty spaces, if the resulting configuration includes other regions of adjacent tokens, these other regions may be removed. This may sometimes be referred to as a combination process or move. Such embodiments may thus allow for a series of successive region-removal steps, which may be accompanied by higher score multipliers or score values. For example, as discussed above, in one embodiment, regions 210 may be constrained to vertical, horizontal, and/or diagonal lines. In one such embodiment, after a user selects a cell and creates a line of three or more adjacent identical tokens, the line may be removed, other tokens may be shifted to fill the empty cells, and new tokens may be randomly selected to fill cells at the edge of the first array. If the first array subsequently contains one or more lines of at least three adjacent identical tokens, these lines may also be removed and the processed token counter incremented. This removal of lines or regions, shift of tokens, and scanning of the array may be repeated iteratively until no more lines or regions of at least three adjacent identical tokens exist in the first array, at which point regular processing may continue.

Returning now to FIG. 1D, the array processing application 120 may include a token generator 152. As discussed above, tokens 206 may be randomly selected to fill in spaces in arrays 202, 204 (or target array 150 and source array(s) 151). Accordingly, token generator 152 may comprise a random number generator or pseudo-random number generator, and/or may calculate a modulus i of a generated random number with i equal to the number of different tokens to select one or more tokens to add to array 202 or 204 to fill empty spaces. In some embodiments, the token generator 152 may select tokens from a subset of the different tokens available. For example, in one such embodiment, the token generator 152 may select tokens from a first subset for filling in array 202 (such as a base set of tokens), and may select tokens from a second subset for filling in array 204 (such as the base set of tokens, plus wildcards or wild tokens, keys, or other special tokens, discussed in more detail below). Accordingly, "randomly selected" may refer to a selection of tokens via a random or pseudo-random number generator, and/or may refer to a selection of a first set of one or more tokens randomly and a second set of one more tokens non-randomly. For example, the token generator may select five tokens for an array 204 randomly and select a special or wild token, discussed in more detail below, to be used as a sixth token in array 204. In some embodiments, the token generator may select all tokens for an array non-randomly, such as responsive to a user- or rules engine-triggered event (e.g. a boost or power, discussed in more detail below).

In some embodiments, the array processing application 120 may include an iteration counter 154. Iteration counter 154 may comprise a counter that is decremented (or incremented to eventually reach a predetermined final value) with each "round" of processing in which a source array 151 is filled to replace one or more tokens. In some embodiments, counter 154 may be referred to as a spin counter because a user interface element for requesting or drawing a new hand may comprise pulling a simulated lever of a slot machine to "spin" the cells of array 204 to new values. In other embodiments, counter 154 may be referred to as a "round" counter, "life" counter, or any other such term. Iteration counter 154 may be set to an initial value that may be varied responsive to difficulty, remaining processing time, or other such features, and may be set automatically or by the user (or, conversely, iteration counter 154 may be set to an initial value of 0 or 1 and incremented to a final value set responsive to difficult, time to process, or other such features).

In some embodiments, the array processing application 120 may include a source array regeneration counter 156. In one such embodiment, the source array regeneration counter may be incremented each time every token in a source array 151 is used to generate adjacent regions 210 in a target array 150, 204. The counter 156 may be incremented, and array 204 may be refilled with randomly selected tokens, and the value of counter 156 may be applied as a multiplier to the score for each token removed. For example, if tokens are normally worth 100 such that matching a region of four adjacent tokens is scored as 400, after successfully utilizing every token in array 204, the counter 156 may be incremented to "2" and a new set of tokens selected for a source array 151. If a region of four adjacent tokens is subsequently matched, the processor may calculate a score of 800.

In many embodiments, the value of counter 156 may be reset if the user or system cannot match any tokens in array 204 and refreshes the tokens in a source array. In a further embodiment, the base value of counter 156 may be permanently increased (for the duration of a game) by matching special tokens, discussed in more detail below. If the user subsequently draws a new hand, the counter 156 may be reset to the permanently increased base value. For example, in one such embodiment, the user may use all tokens in array 204 and increase the counter 156 to "2". The user may then match a special token and increase the counter to "3" and permanently increment the base value to "2". The user may then use all of the tokens in array 204 again, and increase counter 156 to "4". If the user then draws a new hand, the counter may be reset to the increased value of "2". Although discussed in terms of a counter and base value, in many embodiments, counter 156 may comprise two counters, with a first counter incremented for each hand or level completed; the second counter incremented for each level completed; and the first counter reset to the value of the second counter upon drawing a new hand.

In another embodiment, referred to as a "blitz" mode, the array processing application 120 may comprise a timer (not illustrated) of a predetermined number of seconds, such as 30, 60, 120 seconds or any other value. Upon expiration of the timer, processing may end. In one embodiment, the timer may be incremented by a number of seconds if the user successfully uses every token in array 204 as discussed above. For example, in one such embodiment, if the user utilizes every token in their hand, the timer may be incremented by 10 seconds.

In some embodiments, an array processing application 120 may comprise a rules engine 158 for identifying matching adjacent tokens in a region 210 of array 202 and/or determining if a token should be removed or replaced. In some embodiments of an array processor 120, if a user creates a region 210 of adjacent matching tokens of less than a predetermined size by replacing a selected token in array 202 with a second token from array 204, the second token (along with other tokens in region 210) may be removed from array 202 and the empty spaces filled in as discussed above. In a further embodiment, if the user creates a region 210 of adjacent matching tokens of equal to or greater than the predetermined size, the match game 120 may replace the second token with a special token, which may have a distinctive appearance, such as a diamond gem, flashing pattern, or other identifier. Other tokens in region 210 may be removed, and spaces in array 202 filled in as discussed above, leaving the special token in place. Processing may then continue. If, subsequently, the user creates a region 210 of adjacent matching special tokens, in some embodiments, the selected token may be replaced by a second special token, which may have another distinctive appearance, such as a key or other identifier. Processing may then continue again. If, subsequently, the user creates a region 210 of adjacent matching second special tokens, in some embodiments, processing may be completed. Completing the level may result in removal of all tokens in array 202 (frequently with the user receiving a score for each token, which may be increased with a multiplier as discussed above with counter 156), and a new set of tokens selected to fill array 202. In some embodiments, the rules engine may increment the counter upon completing the level, resulting in an extra processing for the user.

Array processor 120 may include a processed token counter 160. Processed token counter 160 may be a counter or string incremented to keep track of a score or number of processed tokens. In many embodiments, the resulting count may be saved to a processed token database 162, which may comprise a list of previous counts. In some embodiments, processed token database 162 may store a plurality of lists, including lists of scores in specific configurations (e.g. "large board" or "normal board"), global or regional score lists received from a server, daily or weekly score lists, or other such lists.

In some embodiments, a score may be shared with other users via social networking services such as Facebook or Twitter, emailed to other users, or communicated to a server for inclusion in global or regional lists via a network agent 164. Network agent 164 may comprise an application, service, daemon, routine, API, or other executable logic for communicating with a server via a network, and may be provided by the operating system of the device. Network agent 164 may transmit and receive information including scores, configurations, user identifiers, or other such information.

In some embodiments, an array processor 120 may include a processing target generator 166, and/or may receive processing targets via a network agent 164 from a server or from other computing devices. A processing target may comprise a configuration, including a board or array size, predetermined region size to generate a special token, number of rounds or iterations, and a target score to meet or exceed. Processing targets may be generated daily, hourly, weekly, or at any other such interval. Processing target generator 166 may comprise an application, service, daemon, routine, or other executable logic, and may be executed by the user's computing device, by a server, or by another user's device. In the latter two implementations, processing targets may be transmitted and received via network agent 164. In some embodiments, a user may manually create a processing target by specifying the configuration, while in other embodiments, the processing target generator 166 may dynamically generate the configuration according to one or more rules. In one such embodiment, each configuration variable may have an associated score and/or difficulty value, and the target score may be calculated responsive to each configuration variable. For example, the processing target generator 166 may randomly select a board size or size for array 204 and/or 202 from a predetermined plurality of board sizes, each having an associated value (e.g. 7×6 array=1, 8×7 array=1.2, etc.); may randomly select a number of base tokens, with a corresponding value (e.g. 5 tokens=1, 6 tokens=0.8, 7 tokens=0.6, etc.); may randomly select a predetermined region size to generate a special token (e.g. region size 6=1, region size 7=0.5, region size 8=0.2, etc.); and may randomly select a number of iterations with an associated value (e.g. 10 spins=1, 15 spins=2, 20 spins=3, etc.). The processing target generator 166 may then calculate a target score as a base score multiplied by each value associated with a variable. For example, and using the exemplary values above and a base score of 100,000, given a challenge of an 8×7 array with 6 tokens, region size 7, and 15 spins, the target score may be 120,000. The associated values for each variable may be set responsive to the corresponding difficulty associated with each variable: more iterations may be easier, resulting in a higher target score; a greater variety of tokens may be more difficult to match, resulting in a lower target score. Accordingly, although the challenges may differ wildly in board size, number of iterations, types of tokens, processing parameters, and target score, each processing target may be roughly equal in difficulty for the user. One of skill in the art may readily appreciate that the exemplary values above are presented for descriptive purposes only, and as such, are selected to make the exemplary mathematics easy. In practice, the values associated with each variable may be much different, and may be set by the developer responsive to testing for consistent difficulty through successive processing targets. In a similar embodiment, rather than using multipliers, specific score values may be used (e.g. utilizing 5 tokens adds 300,000 to the base score, while utilizing 6 tokens adds 200,000 to the base score, etc.). In other embodiments, the array processor may include a series of predetermined configurations with different features, such as board size, number of iterations, types of tokens, target scores, processing parameters, etc. In some such embodiments, the user may be required to complete one or more processing targets (through one or more attempts) before allowing to progress to a successive processing target.

Figure 3:
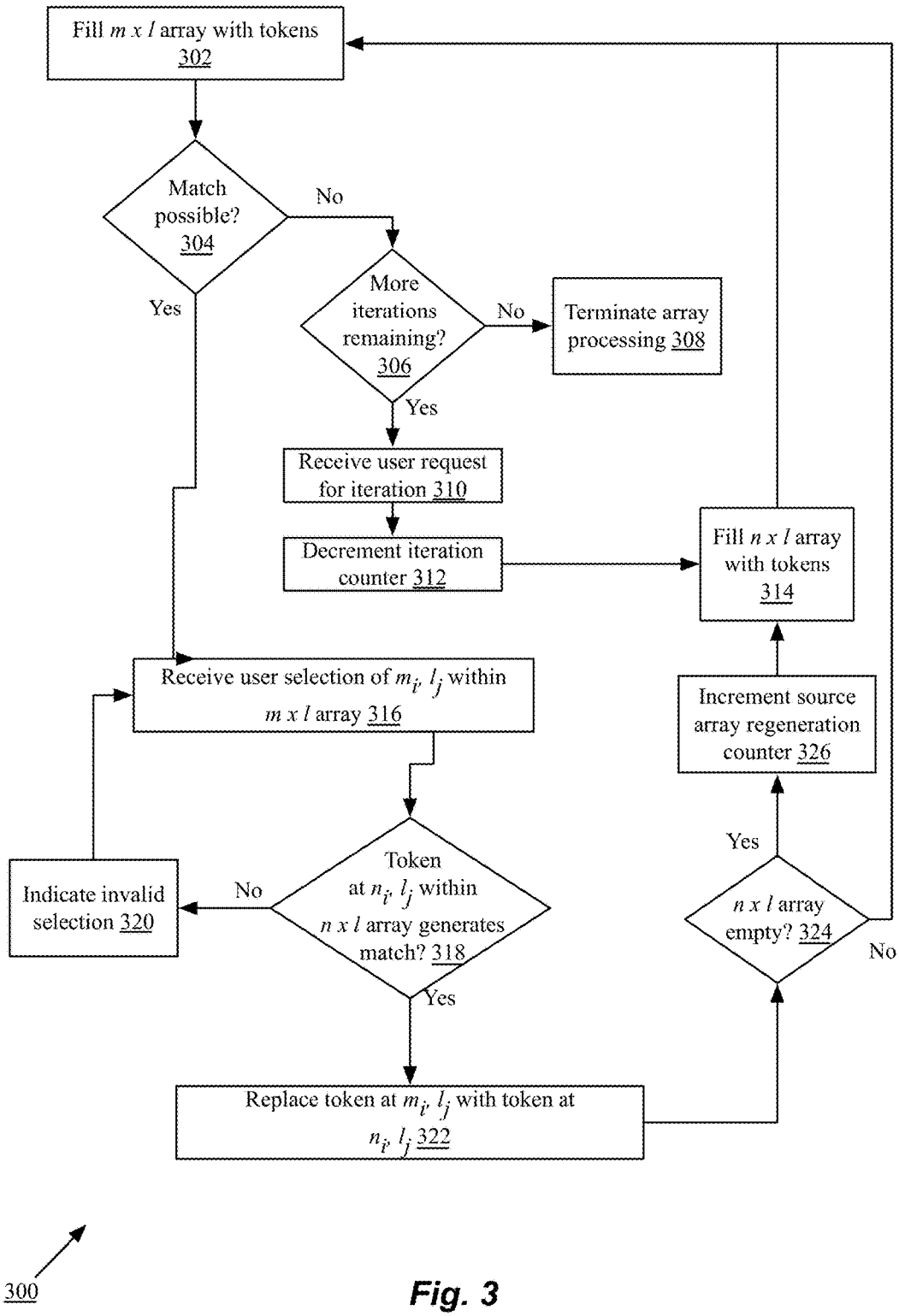
FIG. 3 is a flow chart of an embodiment of a method for processing replacements to a target array from a source array.

Referring now to FIG. 3, illustrated is a flow chart of an embodiment of a method 300 for processing an array. At step 302, the array processor may generate and fill an m×l array with randomly selected tokens. The values of m and l may be set automatically to a default, may be set by the user, may be selected by the user from a plurality of predetermined defaults, or may be set by a processing target engine as discussed above. Similarly, the tokens may be randomly selected from a list of possible tokens, or may be randomly selected from a subset of this list, such as a subset including base tokens and not including wildcard tokens or special tokens. In an initial iteration of method 300, the m×l array may be empty and may be completely filled by selecting random tokens. In later iterations during processing, the array processor may fill empty cells in the array at step 302 with randomly selected tokens. Filling empty cells may, in many embodiments, comprise shifting tokens in cells adjacent to empty cells into the empty cells, and repeating this shifting until the empty cells are at an edge of the array, at which point they may be filled with randomly selected tokens. Although discussed as starting at step 302, in some embodiments, method 300 may begin at another point, such as step 310, step 312, or step 314, discussed below.

At step 304, in some embodiments, the array processor may determine if any matches are possible with tokens in a second n×l array or hand. Determining if a match is possible may comprise scanning each row or column of the m×l array iteratively to identify whether a region of identical adjacent tokens of a predetermined size may be created if a token in a cell in the row or column is replaced with a token in a corresponding cell of the n×l array. As discussed above, a row or column may be scanned responsive to orientation of the n×l array to the m×l array. The predetermined size of the region may be a default value or may be set according to difficulty, a custom setting, a processing target, or any other such method as discussed above. In an initial iteration of method 300, the n×l array may be empty, so accordingly no match is possible. Thus, in some implementations, step 304 may be skipped during an initial iteration and the method may proceed directly to step 310, step 312, or step 314 discussed below. In later iterations, step 304 may be used to determine if the user has any possible matches available.

If no match is possible at step 304, then at step 306, the array processor determines whether the user has any more iterations or rounds of processing remaining. As discussed above, the array processor may maintain an iteration counter which may be decremented (or conversely, incremented towards a final value) with each round and fill of the n×l array. In an initial iteration, step 306 may be skipped, as the user will have at least one iteration remaining.

If the user has no more iterations remaining, then at step 308 in some implementations, the array processor may terminate processing of the array. At step 310, if the user has more iterations remaining, then in some embodiments, the array processor may present a user interface element, such as a button or lever. In one implementation, the lever may be presented as a slot machine-style lever. In other implementations, the array processor may present a button, switch, slide, or any other interface element. In one embodiment during an initial iteration of method 300, step 310 may be skipped and the first hand may be automatically drawn for the user.

At step 312, responsive to the user activating the lever or otherwise requesting a new hand (or automatically in implementations in which step 310 is skipped), the iteration counter may be decremented (or incremented in embodiments in which the counter counts up to a terminal value). At step 314, the array processor may fill the n×l array with tokens. In one embodiment, the tokens may be randomly selected from the entire list of tokens, including wildcards and/or special tokens, while in another embodiment, the token may be randomly selected from a subset of the tokens. In some embodiments, the subset of the tokens may comprise tokens currently in play in the m×l array, and may further include a wildcard token. For example, in one such embodiment, if the m×l array includes only base tokens and no special tokens, the subset may include only the base tokens and wildcard tokens. If the m×l array includes a special token, the special token may be added to the subset. This enables a user to create regions of adjacent special tokens, but avoids including the special tokens if others are not currently in play, to avoid frustrating the user with unmatchable tokens. After step 314, in some embodiments of method 300, the array processor may repeat step 302. In a first iteration of method 300, this may be unnecessary, as the array processor may have already filled the m×l array, and accordingly, in some embodiments, step 302 may be skipped. In other embodiments of method 300, method 300 may begin at another point, such as step 310, step 312, or step 314, and step 302 may be performed.

Step 304 may be repeated as shown to determine if a region of adjacent identical tokens may be generated in the m×l array by replacing a token with a corresponding token of the n×l array. If not, then steps 306-314 may be repeated. If so, then at step 316, the array processor may wait for and receive a user selection of a cell within the m×l array, referred to as cell $m_i$, $l_j$. User selection of the cell may be via a touchscreen, such as touching the cell, or may be via a cursor or mouse click, text entry, gesture, or other input method.

At step 318, the array processor may determine if replacing the token in cell at $m_i$, $l_j$ with a token in the corresponding cell $n_i$, $l_j$ of the n×l array may result in a region of adjacent identical tokens of at least a predetermined size. In many embodiments, the size of n may be 1, such that the value i may be ignored. In other embodiments, the size of n may be equal to m with a token in the n×l array corresponding to every token in the m×l array. In still other embodiments, n may be a factor of m such that each token in the n×l array may correspond to some, but not all tokens in the corresponding row or column of the m×l array. For example, m may be 6 and n may be 2, with $n_1$ corresponding to $m_{1-3}$ and $n_2$ corresponding to $m_{4-6}$. As such, one may readily appreciate that the corresponding cell $n_i$, $l_j$ may have a different value of i in some embodiments. The array processor may use any method to identify and determine the size of potential regions of identical tokens, including flood-fill algorithms, filling a second m×l array with the $n_i$, $l_j$ token and calculating a conjunction of the arrays, performing a breadth-first or depth-first search for identical tokens around the selected cell $m_i$, $l_j$, or any other method. In some embodiments in which the token in cell $n_i$, $l_j$ is a wildcard token, the array processor may use a variable in the search methods or otherwise allow the wildcard token to match any other token in array m×l.

If the array processor does not determine that a match or region will be generated, then at step 320, the array processor may indicate that the selection is invalid. This may include flashing an interface element, outputting a sound, showing a pop-up message, or any other indicator. In some embodiments, if cell $n_i$, $l_j$ is empty (such as if the token in that cell has already been used), then the array processor may skip step 318 and go directly to step 320.

In some embodiments, if the user has not made a valid selection within a predetermined time period, the array processor may indicate a potentially valid selection within the m×l array, such as arrows or a flashing border around a cell or any other such indication.

If the array processor determines that a region will be generated if the token in cell $n_i$, $l_j$ is placed in the selected cell, then at step 322, the replacement may be performed. The array processor may identify the created region of adjacent identical tokens and may remove the tokens and increment a counter accordingly, as discussed above. In some embodiments, if the region is greater than a predetermined size, the array processor may place a special token in the cell $m_i$, $l_j$ after removing the tokens. In another embodiment, if the matched tokens are the special token, the array processor may place a second special token, such as a wildcard token, in the cell $m_i$, $l_j$ after removing the tokens. In a further embodiment, if the user subsequently selects and generates a region of adjacent identical tokens of a first type (e.g. a base token) that includes or is adjacent to the second special token, the array processor may remove all of the tokens of the first type in the m×l array, regardless of position, and increment the processed token counter accordingly. The array processor may then place a third special token in the cell $m_i$, $l_j$ after removing the tokens. In another embodiment, if the user subsequently selects and generates a region of adjacent identical tokens of the third special token type, the array processor may clear the m×l array, incrementing the processed token counter for each token removed, and skip to step 326, discussed below. A bonus counter (and/or permanent bonus counter or base level for the counter) may be incremented, as discussed above.

At step 324, the array processor may determine if the n×l array or user's hand is empty. If not, then method 300 may continue with step 302, filling in any empty spaces in the m×l array resulting from the removal of tokens at step 322 as discussed above. If so, at step 326, then the array processor may increment a bonus or source array regeneration counter as discussed above and may repeat step 314 before continuing with step 302. This may be referred to as finishing a hand.

As shown, method 300 may be iteratively repeated with the user playing tokens from his or her hand in the playing field to generate matches and special tokens, and/or failing to match tokens and requesting a new hand or source array, until the user runs out of iterations.

As discussed above, in some embodiments, sometimes referred to as "blitz" mode, the array processor may execute a timer of a predetermined duration. If the timer expires, processing may end and the array processor may proceed to step 308. In some embodiments, if the user utilizes every token in the n×l array, then at step 326, the timer may be incremented by a predetermined amount of time, such as 5 seconds, 10 seconds, 15 seconds, or any other value, to provide an extended period. In other embodiments, processing may end upon completion of a predetermined goal, such as a number of tokens matched, a score reached, or any other such feature. In some embodiments, such as upon reaching a processing target, the array processor may fill the n×l array with one or more "wild" tokens which may be used to match any other tokens at step 318. In a further such embodiment, the array processor may automatically play through iterations of method 300 with the wild tokens until the n×l array is empty, skipping from step 324 to step 308.

In some implementations, a target array may be associated with a single source array, and processing and replacement of tokens may include iteratively moving existing tokens within the array downwards from higher numbered rows to lower numbered rows (when counted upwards from the bottom of the array) to fill empty spaces. An improved system may provide for iterative shifts of tokens within an array in a direction corresponding to a second array positioned relative to the first, and thus allow multiple source arrays. For example, given a second array (e.g. first source array) positioned below the first array (e.g. target array), tokens in the first array may be slid or iteratively shifted downwards into empty cells of the first array. Given a third array (e.g. second source array) positioned above the first array, tokens in the first array may be slid or iteratively shifted upwards into empty cells of the first array. Similarly, tokens may be slid horizontally towards or away from columnar arrays bordering the first array. This provides additional functionality to the array processor. Furthermore, while a similar result may be achieved by inverting the target array (such that a top row becomes a bottom row and vice versa), applying similar processing rules to those discussed above, and then re-inverting the target array, this may require additional memory and intra-process bandwidth. Accordingly, dynamically varying direction of replacement and shifting within the target array may result in improved functionality and memory and processing efficiency.

Referring now to FIGS. 4A-4I, illustrated are steps of processing of a target array with multiple source arrays, according to some implementations. As discussed above, a target array 150 may comprise a first array 402 and may be associated with or bordered by a second array 404a or source array 151a, as well as a third array 404b or source array 151b. The first array 402 may be referred to as a playing field, in-play field, or by similar terms, and may have a dimension of l×m. In some embodiments, as shown, l and m may be identical values and the array may be square, while in other embodiments, the array may be rectangular. In some embodiments, the array processing application 120 may have different modes including "small boards" and "large boards" with correspondingly different values of l and m, such as 6×7 for a "small" board and 7×8 for a "large" board. Other values and sizes may be used, as well as other relative descriptors, including "tiny", "normal", "big", "huge", or any other value. In some embodiments, a user may be able to specify a size of one or both of l and m.

Second array 404a and third array 404b may be referred to as "hands", a source array 151, or by a similar term, and may each have a dimension of l×n. Each source array 404a-404b may be associated with a different user, application, device, or other entity. Although shown at opposite ends of target array 402, in some implementations, a first source array 404 may be positioned below or associated with one side of a target array and a second source array may be positioned to the side of or associated with an adjacent side of the target array. Each cell in arrays 404 may correspond to a column or row of cells in first array 402 (depending on orientation of arrays 404 to the first array 402). For example, in implementations using the orientation shown, each cell in arrays 404 may correspond to a column of cells in first array 402, such that a user or processor may swap any token in the column of first array 402 with the token in the corresponding cell of an array 404.

As shown, each cell may include a token 406a-406e, which may be of any type and represent any entity and be visualized in various shapes and/or colors, referred to generally as token(s) 406. In some embodiments, tokens 406 may be referred to as "gems", "coins", "cards", "icons", "sprites", "items", or any other such identifier. Although shown as polyhedrons, tokens 406 may also comprise playing cards of different values such as jacks, queens, kings, and aces; alphanumeric icons; Greek letters or symbols; blocks of different colors and/or patterns; icons of different types of candy, foods, or animals; or any other type of distinct shapes, letters, colors, symbols, portraits, devices, or icons.

Figure 4A:
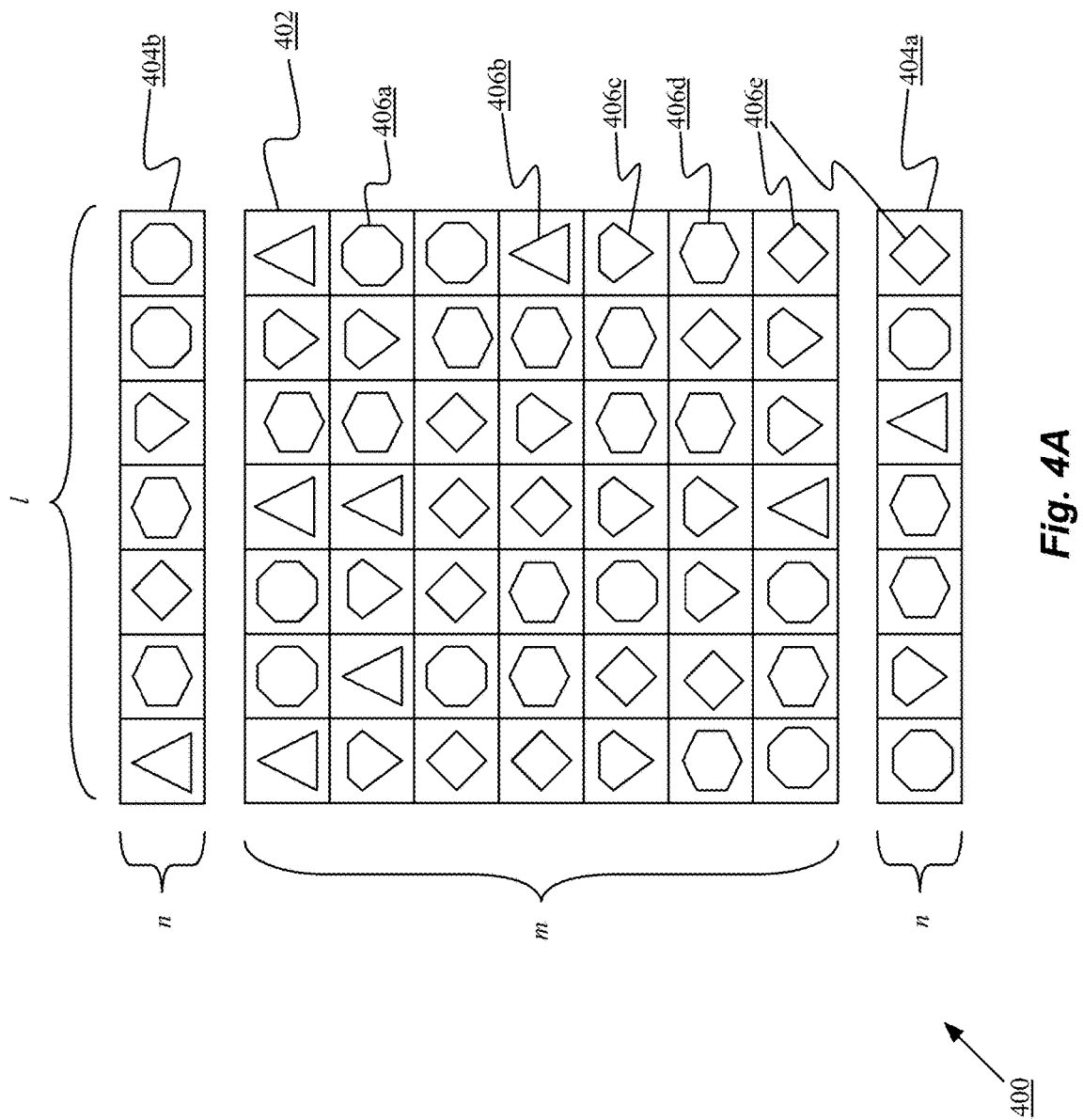
FIGS. 4A-4I are diagrams illustrating successive steps of token selection, replacement, and counter incrementing in an embodiment of a method for processing replacements to a target array from a plurality of source arrays.
Figure 4B:
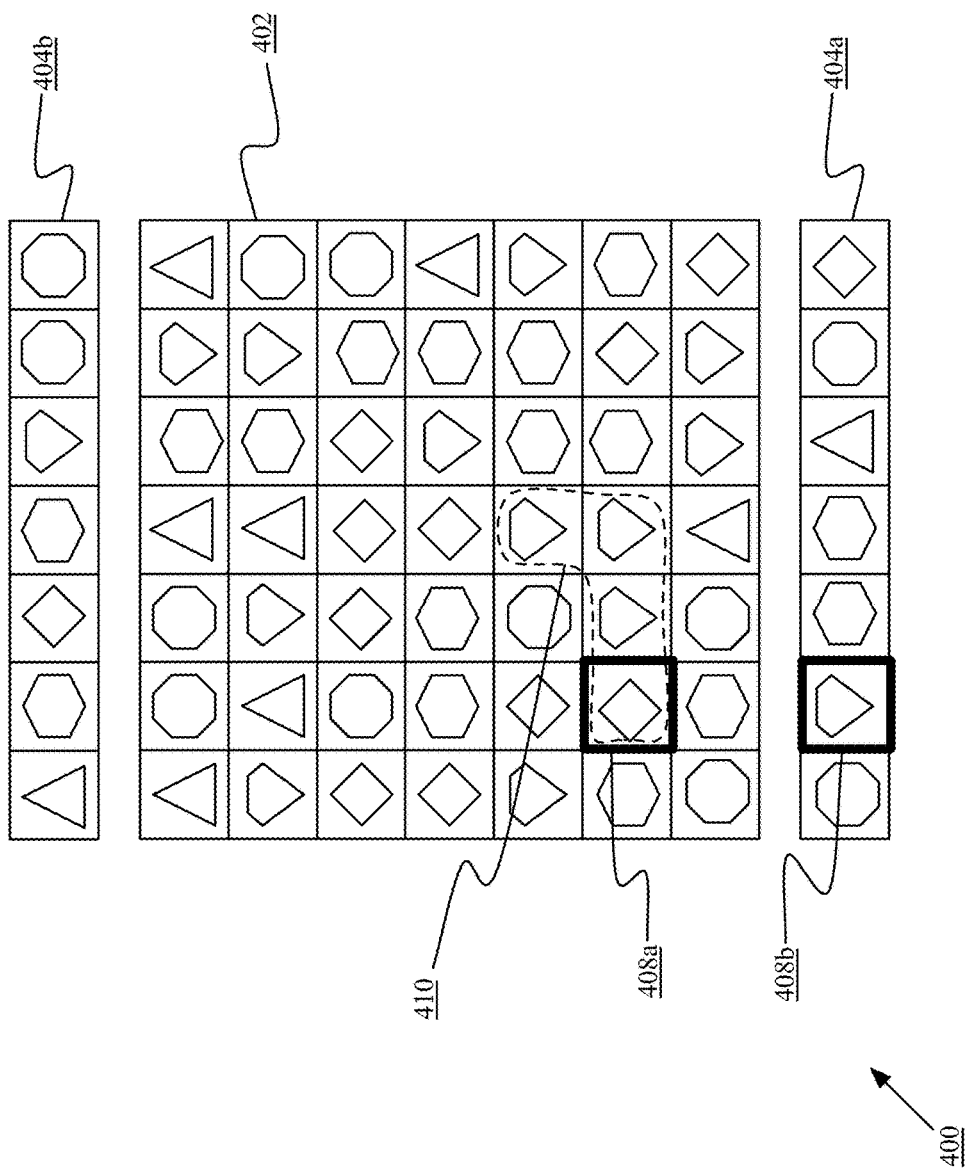
Figure 4C:
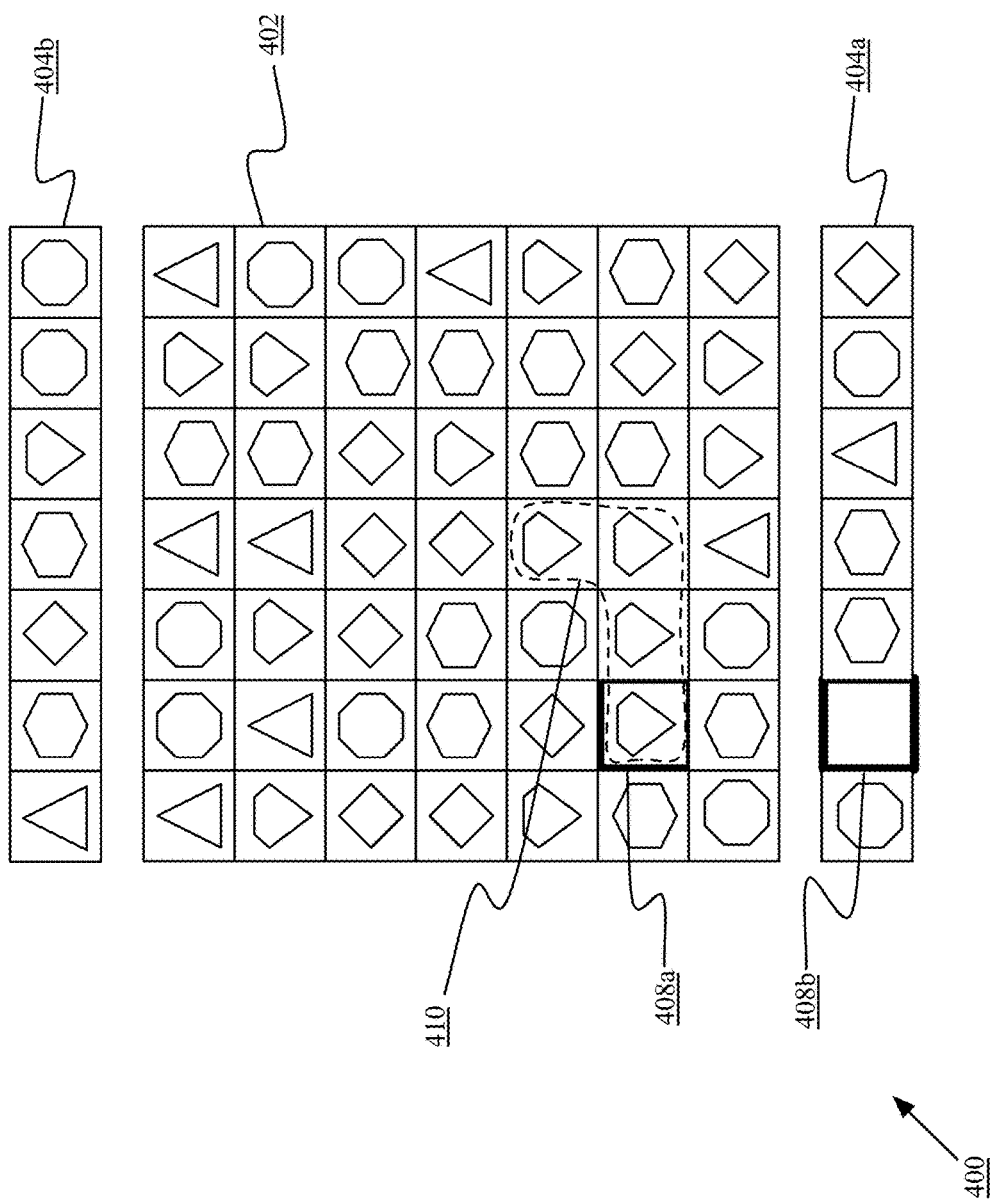

Similar to the implementation discussed above in connection with FIGS. 2A-2D, as shown in FIG. 4B, during processing, a user may select a cell 408a of first array 402 (illustrated in bold line) to replace the token 406 within said cell 408a with a token in a corresponding cell 408b of second array 404a (illustrated in bold line). As discussed above, cell 408b may correspond to any cell in the corresponding column (or row, depending on orientation) of first array 402. By replacing the token 406 in cell 408a with the token 406 in cell 408b, the user may create a region 410 of adjacent identical tokens 406 (illustrated in dashed line) as shown in FIG. 4C. In some implementations, the user may freely replace any token in a cell 408a, while in other implementations, the user may only replace a token in a cell 408a if it results in creation of a region 410 of adjacent identical tokens. In many implementations, the region 410 may have a minimum size, such as three adjacent tokens, and the user may not replace the token in cell 408a if it results in creation of a region 410 of less than the minimum size.

Although shown as a non-linear region 410, in some embodiments or processing modes, the region 410 may be constrained to a single line. For example, in one such embodiment, a user may select a cell to replace with a token from a corresponding cell in the second array 404a and create a line of three adjacent or more tokens. These tokens may then be removed. Lines may be vertical, horizontal, or, in some embodiments, diagonal.

Figure 4D:
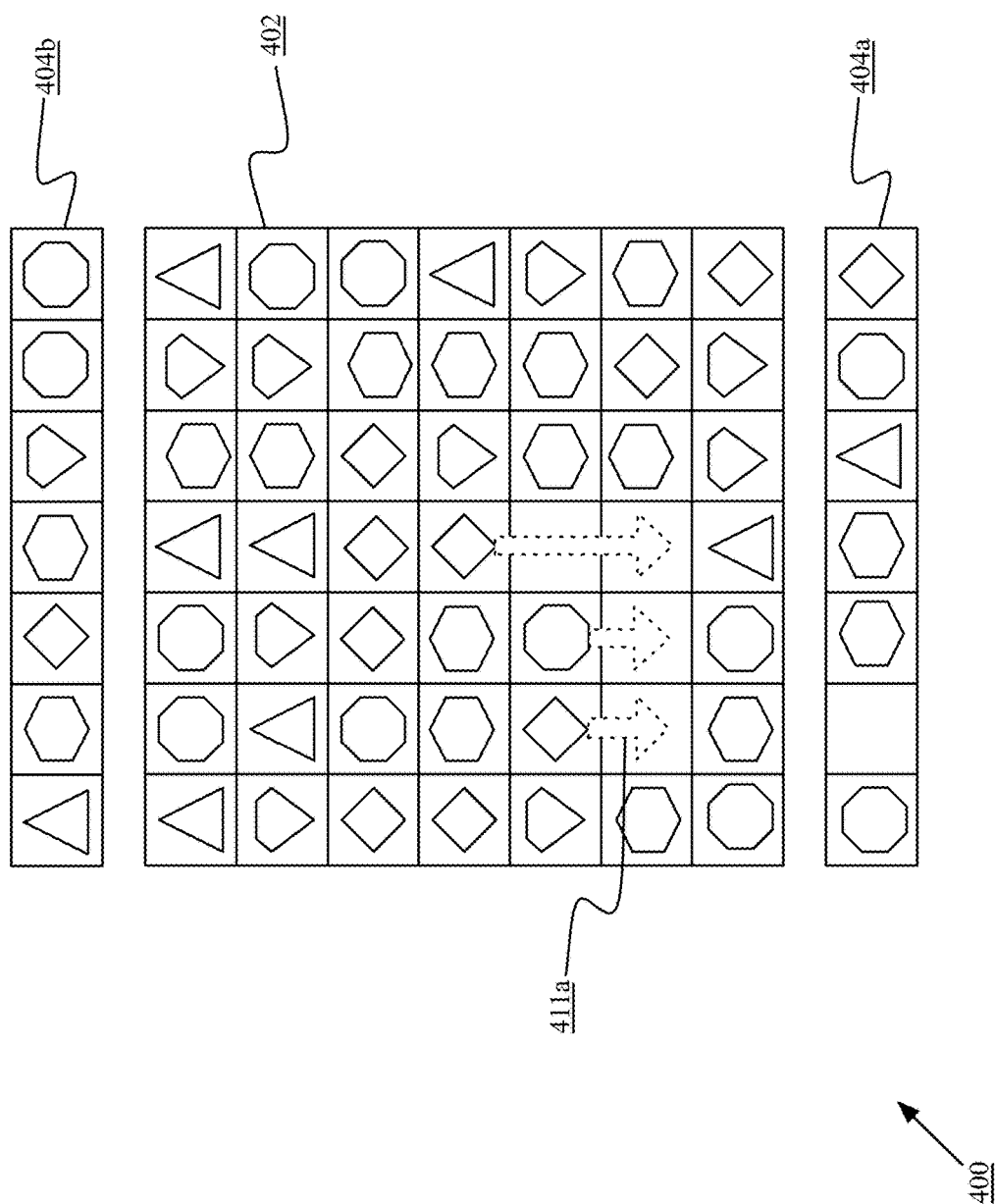
Figure 4E:
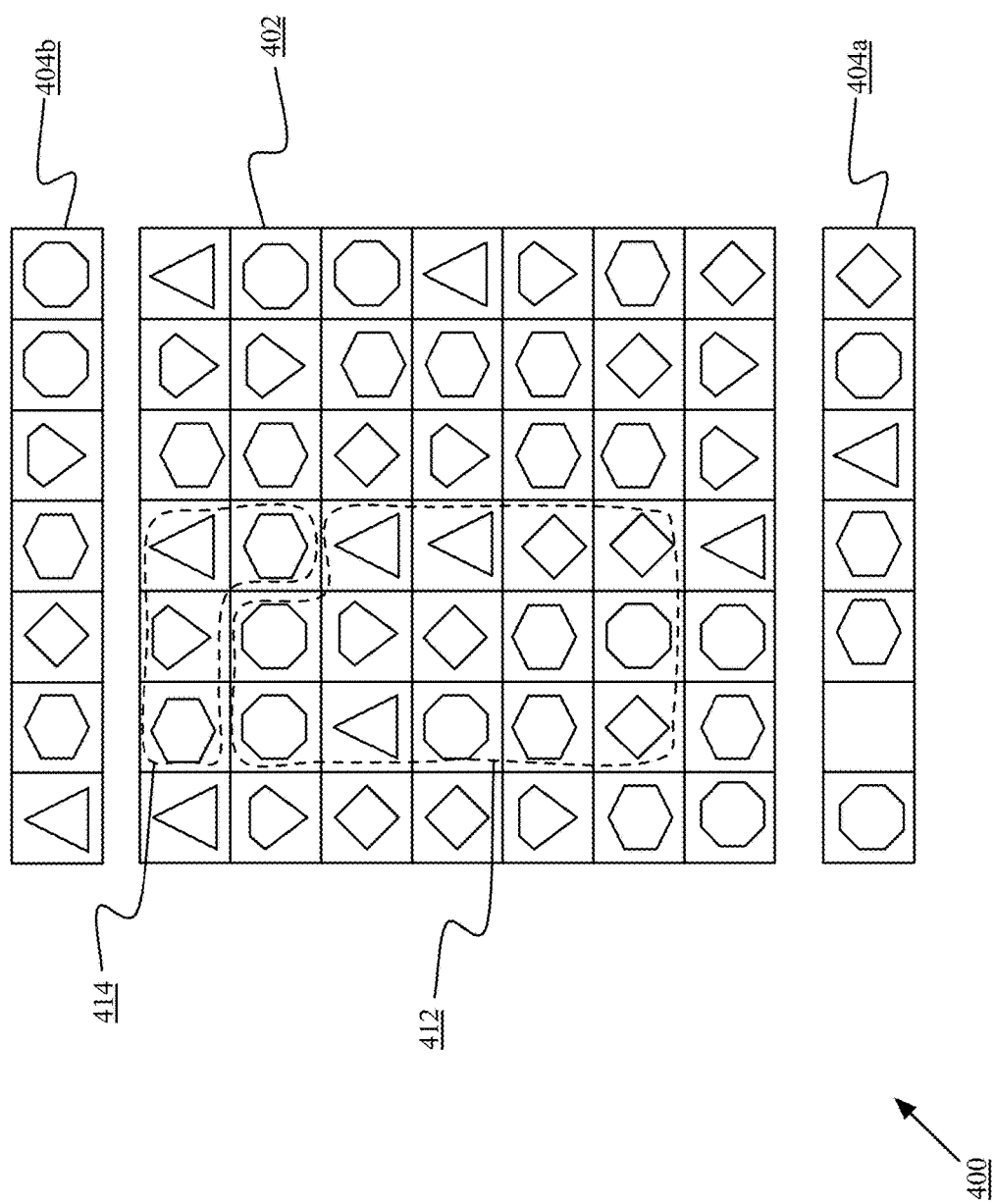

Once a region of adjacent identical tokens 410 has been created, the tokens within the region 410 may be removed and a processed token counter may be incremented. The processed token counter may be specific to and associated with first source array 404a (e.g. a first processed token counter of a plurality of processed token counters). In some implementations, the processed token counter may be referred to as a score. In some embodiments, the user may receive a score of a predetermined value multiplied by the number of tokens within the region. For example, given a score value of 100, generating a region of five tokens may result in a score of 500, while generating a region of eight tokens may result in a score of 800. In other embodiments, the counter may be incremented by a predetermined value raised to a power of the number of tokens within the region, such as 2^n. Other scoring values may be used, such as bonuses for generating a region of seven tokens. Once the tokens in region 410 are removed, resulting empty cells in array 402 may be filled in. In some embodiments, as shown in FIG. 4D, tokens in cells of positions above the region 410 in the array 402 may be lowered or slid downwards as shown by dashed arrows 411a to fill the empty spaces (shown in dotted line as region 412 in FIG. 4E). The resulting empty spaces may thus be raised to the top of the array (region 414 in dotted line in FIG. 4E), and new tokens 406 may be selected randomly to fill said empty spaces. This allows the user to apply some strategy through removal of tokens in lower spaces in the array to shift tokens in higher spaces into new adjacent regions.

In some embodiments, the region 410 may be removed once per user selection. In other embodiments, after removal and shifting of other tokens to fill empty spaces, if the resulting configuration includes other regions of adjacent tokens, these other regions may be removed. This may sometimes be referred to as a combination process or move. Such embodiments may thus allow for a series of successive region-removal steps, which may be accompanied by higher score multipliers or score values. For example, as discussed above, in one embodiment, regions 410 may be constrained to vertical, horizontal, and/or diagonal lines. In one such embodiment, after a user selects a cell and creates a line of three or more adjacent identical tokens, the line may be removed, other tokens may be shifted to fill the empty cells, and new tokens may be randomly selected to fill cells at the edge of the first array. If the first array subsequently contains one or more lines of at least three adjacent identical tokens, these lines may also be removed and the processed token counter incremented. This removal of lines or regions, shift of tokens, and scanning of the array may be repeated iteratively until no more lines or regions of at least three adjacent identical tokens exist in the first array, at which point regular processing may continue.

Figure 4F:
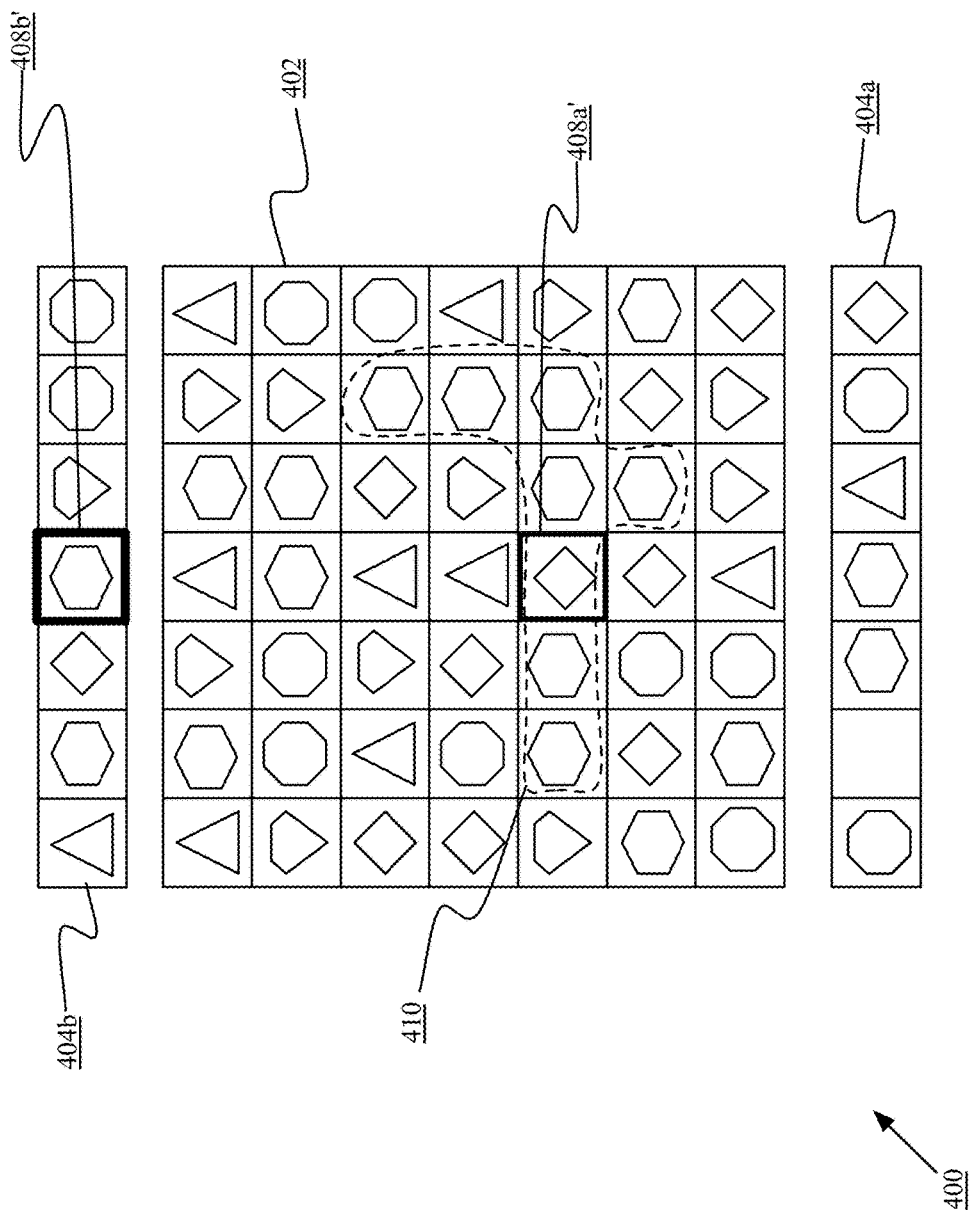
Figure 4G:
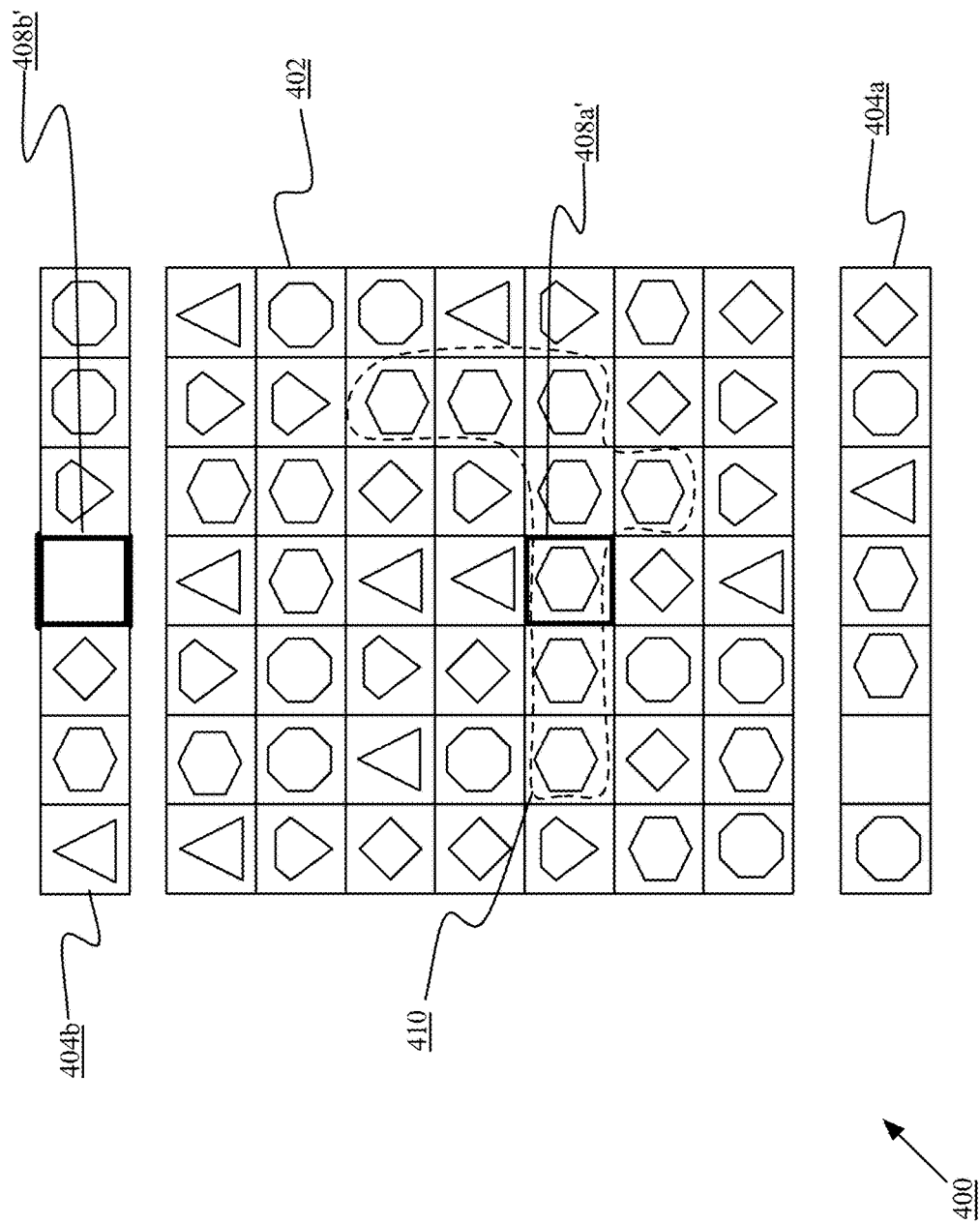

A user associated with a second source array (e.g. array 404b) may similarly select a cell within target array 402 for replacement of tokens. Referring now to FIG. 4F, as shown, a user may select a cell 408a' of first array 402 (illustrated in bold line) to replace the token 406 within said cell 408a' with a token in a corresponding cell 408b' of third array 404b (illustrated in bold line). As discussed above, cell 408b' may correspond to any cell in the corresponding column (or row, depending on orientation) of first array 402. As discussed above, by replacing the token 406 in cell 408a' with the token 406 in cell 408b', the user may create a region 410 of adjacent identical tokens 406 (illustrated in dashed line) as shown in FIG. 4G.

As with creation of regions 410 from a first source array 404a, once a region of adjacent identical tokens 410 has been created via replacement of tokens from second source array 404b, the tokens within the region 410 may be removed and a processed token counter may be incremented. The processed token counter may be specific to and associated with second source array 404b (e.g. a second processed token counter). Once the tokens in region 410 are removed, resulting empty cells in array 402 may be filled in.

Figure 4H:
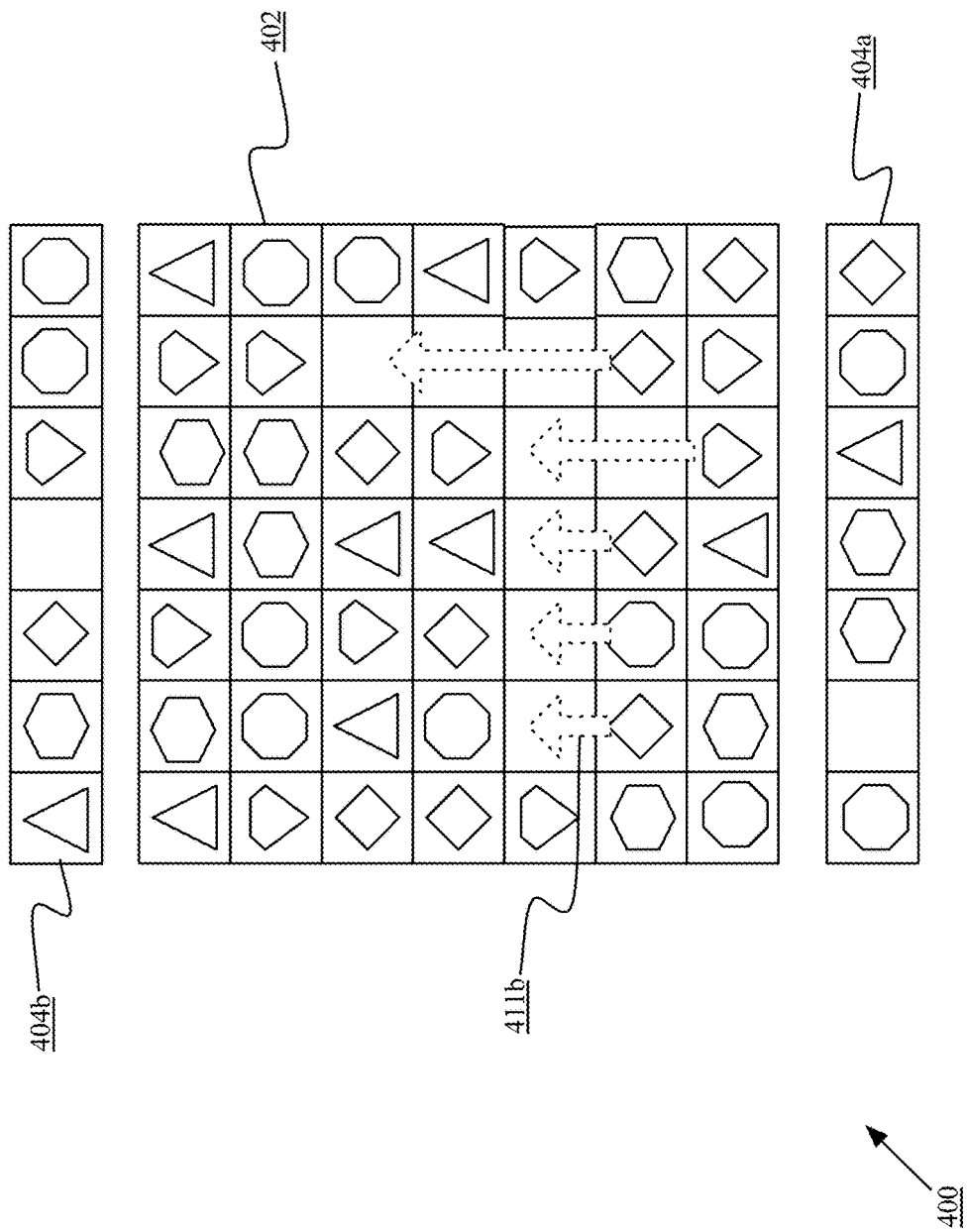
Figure 4I:
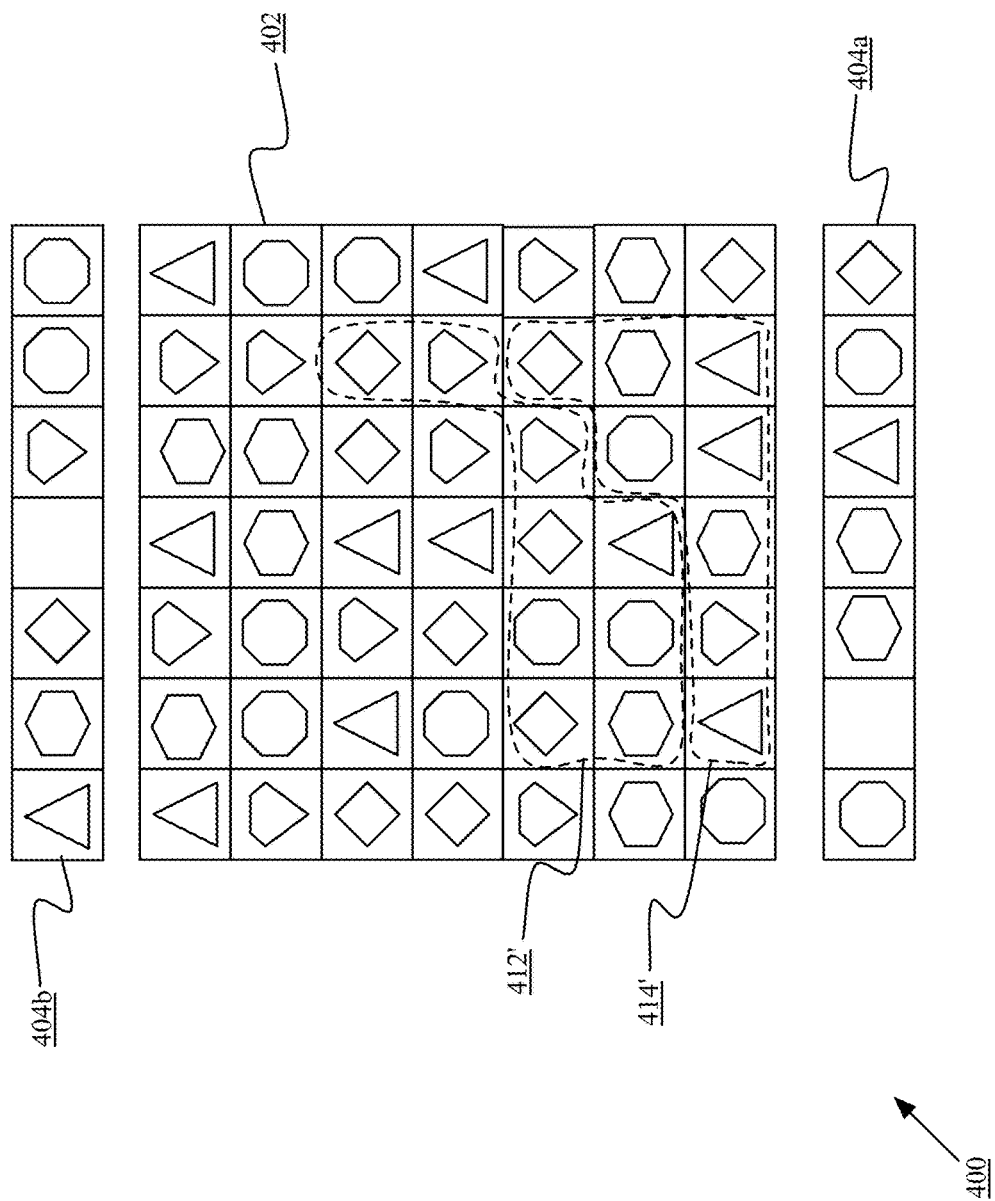

In some embodiments, as shown in FIG. 4H, tokens in cells of positions below the region 410 in the array 402 may be raised or slid upwards as shown by dashed arrows 411b to fill the empty spaces (shown in dotted line as region 412' in FIG. 4I). The resulting empty spaces may thus be raised to the top of the array (region 414' in dotted line in FIG. 4I), and new tokens 406 may be selected randomly to fill said empty spaces.

In some embodiments, the region 410 may be removed once per user selection. In other embodiments, as discussed above, after removal and shifting of other tokens to fill empty spaces, if the resulting configuration includes other regions of adjacent tokens, these other regions may be removed. In such a combination move, the array processor may continue shifting tokens in a direction associated with or towards the corresponding source array associated with triggering of the move.

Although discussed above with two source arrays, in many implementations, additional source arrays may be associated with or positioned on other sides of the target array. Selection of tokens in the target array for replacement with tokens from corresponding cells of each source may rotate between each source array (e.g. clockwise, counterclockwise, randomly selected round-robin order, etc.). Additionally, although illustrated in FIGS. 4A-4I with tokens sliding towards the source array that was used to replace a token and generate a region of identical tokens (e.g. "downwards" towards the array at the bottom, and "upwards" towards the array at the top), in many implementations, the sliding behavior may be reversed to shift empty spaces towards the corresponding source array or slide tokens in the opposite direction (e.g. "upwards" away from the array at the bottom, and "downwards" away from the array at the top).

Figure 5A:
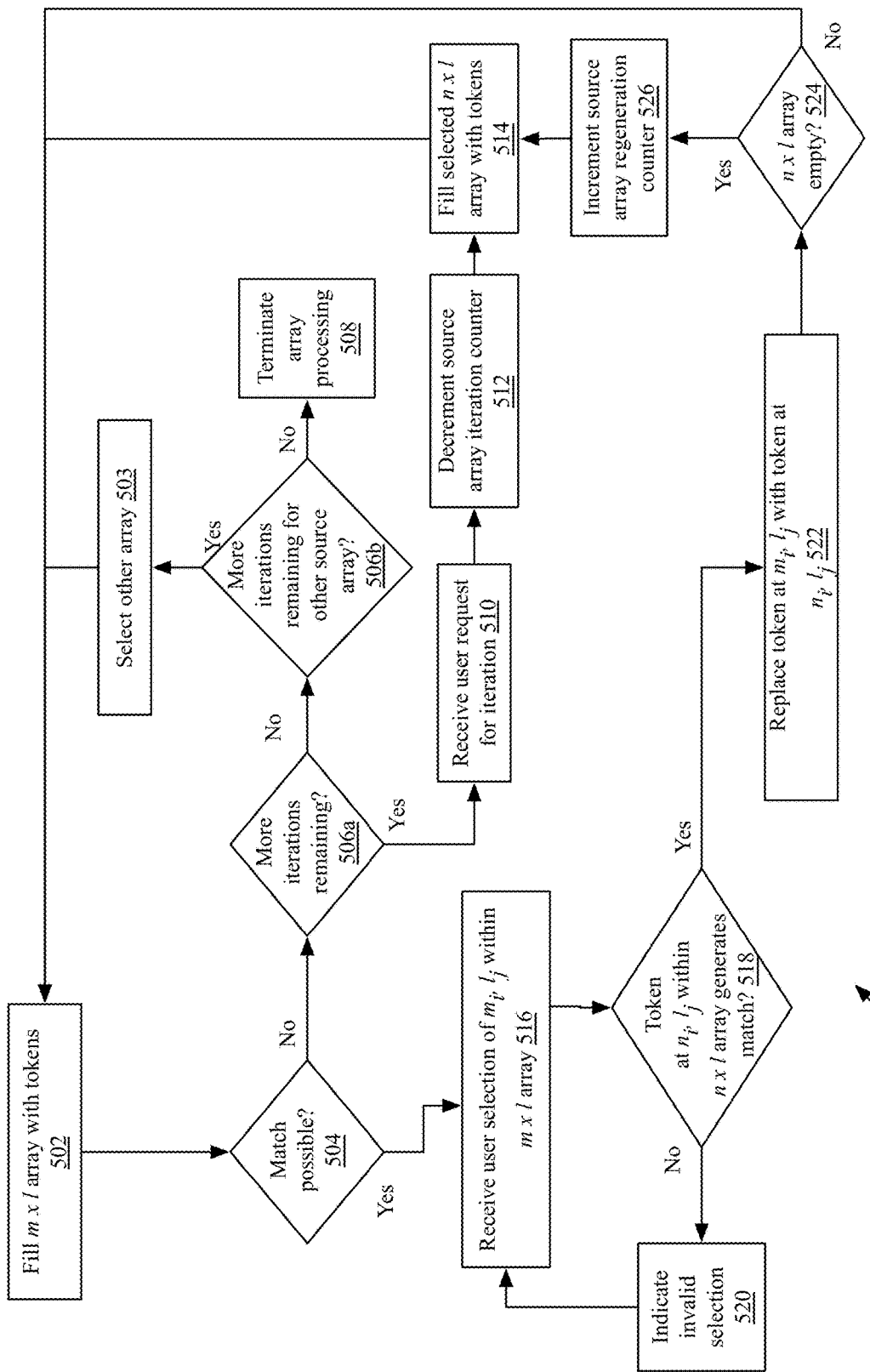
FIGS. 5A-5B are flow charts of an embodiment of a method for processing replacements to a target array from a plurality of source arrays.

Referring now to FIG. 5A, illustrated is a flow chart of an embodiment of a method 500 for processing an array. At step 502, the array processor may generate and fill an m×l array with randomly selected tokens. The values of m and l may be set automatically to a default, may be set by the user, may be selected by the user from a plurality of predetermined defaults, or may be set by a processing target engine as discussed above. Similarly, the tokens may be randomly selected from a list of possible tokens, or may be randomly selected from a subset of this list, such as a subset including base tokens and not including wildcard tokens or special tokens. In an initial iteration of method 500, the m×l array may be empty and may be completely filled by selecting random tokens. In later iterations during processing, the array processor may fill empty cells in the array at step 502 with randomly selected tokens. Filling empty cells may, in many embodiments, comprise shifting tokens in cells adjacent to empty cells into the empty cells, and repeating this shifting until the empty cells are at an edge of the array, at which point they may be filled with randomly selected tokens. Although discussed as starting at step 502, in some embodiments, method 500 may begin at another point, such as step 510, step 512, or step 514, discussed below.

At step 504, in some embodiments, the array processor may determine if any matches are possible with tokens in a second n×l array, source array, or hand. Determining if a match is possible may comprise scanning each row or column of the n×l array iteratively to identify whether a region of identical adjacent tokens of a predetermined size may be created if a token in a cell in the row or column is replaced with a token in a corresponding cell of the n×l array. As discussed above, a row or column may be scanned responsive to orientation of the n×l array to the m×l array.

The predetermined size of the region may be a default value or may be set according to difficulty, a custom setting, a processing target, or any other such method as discussed above. In an initial iteration of method 500, the n×l array may be empty, so accordingly no match is possible. Thus, in some implementations, step 504 may be skipped during an initial iteration and the method may proceed directly to step 510, step 512, or step 514 discussed below. In later iterations, step 504 may be used to determine if the user has any possible matches available.

If no match is possible at step 504, then at step 506a, the array processor may determine whether the user has any more iterations or rounds of processing remaining. As discussed above, the array processor may maintain an iteration counter associated with a source array (e.g. a first iteration counter of a plurality of iteration counters) which may be decremented (or conversely, incremented towards a final value) with each round and fill of the n×l array. In an initial iteration, step 506a may be skipped, as the user associated with the first array will have at least one iteration remaining.

If the user has no more iterations remaining, then at step 506b, in some implementations, the array processor may determine (e.g. from an iteration counter associated with the second source array or user, such as a second iteration counter of a plurality of iteration counters), whether more iterations remain for the next array. If so, then at step 503, the next array may be selected. In some implementations, step 506b may be repeated for each next array until identifying an array with remaining iterations (according to an iteration counter associated with said array). Upon identifying an array with remaining iterations, steps 502-506b may be repeated. Otherwise, at step 508 in some implementations, the array processor may terminate processing of the array.

At step 510, if a user or source array has more iterations remaining, then in some embodiments, the array processor may present a user interface element, such as a button or lever. In one implementation, the lever may be presented as a slot machine-style lever. In other implementations, the array processor may present a button, switch, slide, or any other interface element. In one embodiment during an initial iteration of method 500, step 510 may be skipped and the first hand may be automatically drawn for the user.

At step 512, responsive to the user activating the lever or otherwise requesting a new hand (or automatically in implementations in which step 510 is skipped), the iteration counter associated with the source array may be decremented (or incremented in embodiments in which the counter counts up to a terminal value). At step 514, the array processor may fill the corresponding n×l array with tokens. In one embodiment, the tokens may be randomly selected from the entire list of tokens, including wildcards and/or special tokens, while in another embodiment, the token may be randomly selected from a subset of the tokens. In some embodiments, the subset of the tokens may comprise tokens currently in play in the m×l array, and may further include a wildcard token. After step 514, in some embodiments of method 500, the array processor may repeat step 502. In a first iteration of method 500, this may be unnecessary, as the array processor may have already filled the m×l array, and accordingly, in some embodiments, step 502 may be skipped. In other embodiments of method 500, method 500 may begin at another point, such as step 510, step 512, or step 514, and step 502 may be performed.

Step 504 may be repeated as shown to determine if a region of adjacent identical tokens may be generated in the m×l array by replacing a token with a corresponding token of the n×l array. If not, then steps 506-314 may be repeated.

If so, then at step 516, the array processor may wait for and receive a user selection of a cell within the m×l array, referred to as cell $m_i$, $l_j$. User selection of the cell may be via a touchscreen, such as touching the cell, or may be via a cursor or mouse click, text entry, gesture, or other input method.

At step 518, the array processor may determine if replacing the token in cell at $m_i$, $l_j$ with a token in the corresponding cell $n_i$, $l_j$ of the n×l array may result in a region of adjacent identical tokens of at least a predetermined size. In many embodiments, the size of n may be 1, such that the value i may be ignored. In other embodiments, the size of n may be equal to m with each token in the n×l array corresponding to a single token in the m×l array. In still other embodiments, n may be a factor of m such that each token in the n×l array may correspond to some, but not all tokens in the corresponding row or column of the m×l array. The array processor may use any method to identify and determine the size of potential regions of identical tokens, including flood-fill algorithms, filling a second m×l array with the $n_i$, $l_j$ token and calculating a conjunction of the arrays, performing a breadth-first or depth-first search for identical tokens around the selected cell $m_i$, $l_j$, or any other method. In some embodiments in which the token in cell $n_i$, $l_j$ is a wildcard token, the array processor may use a variable in the search methods or otherwise allow the wildcard token to match any other token in array m×l.

If the array processor does not determine that a match or region will be generated, then at step 520, the array processor may indicate that the selection is invalid. This may include flashing an interface element, outputting a sound, showing a pop-up message, or any other indicator. In some embodiments, if cell $n_i$, $l_j$ is empty (such as if the token in that cell has already been used), then the array processor may skip step 518 and go directly to step 520.

In some embodiments, if the user has not made a valid selection within a predetermined time period, the array processor may indicate a potentially valid selection within the m×l array, such as arrows or a flashing border around a cell or any other such indication.

If the array processor determines that a region will be generated if the token in cell $n_i$, $l_j$ is placed in the selected cell, then at step 522, the replacement may be performed. The array processor may identify the created region of adjacent identical tokens and may remove the tokens and increment a processed token counter associated with the source array (e.g. a first processed token counter for a first source array) accordingly, as discussed above. In some embodiments, if the region is greater than a predetermined size, the array processor may place a special token in the cell $m_i$, $l_j$ after removing the tokens. In another embodiment, if the matched tokens are the special token, the array processor may place a second special token, such as a wildcard token, in the cell $m_i$, $l_j$ after removing the tokens. In a further embodiment, if the user subsequently selects and generates a region of adjacent identical tokens of a first type (e.g. a base token) that includes or is adjacent to the second special token, the array processor may remove all of the tokens of the first type in the m×l array, regardless of position, and increment the processed token counter accordingly. The array processor may then place a third special token in the cell $m_i$, $l_j$ after removing the tokens. In another embodiment, if the user subsequently selects and generates a region of adjacent identical tokens of the third special token type, the array processor may clear the m×l array, incrementing the processed token counter for each token removed, and skip to step 526, discussed below. A bonus counter (and/or permanent bonus counter or base level for the counter) may also be incremented, as discussed above. The bonus counter may be associated with the source array (and accordingly the array processor may maintain a plurality of bonus counters), while in other implementations, a single bonus counter may be associated with the target array and may be common to all source arrays.

At step 524, the array processor may determine if the n×l array or user's hand is empty. If not, then method 500 may continue with step 502, filling in any empty spaces in the m×l array resulting from the removal of tokens at step 522 as discussed above. If so, at step 526, then the array processor may increment a bonus or source array regeneration counter as discussed above and may repeat step 514 before continuing with step 502.

As shown, method 500 may be iteratively repeated for each source array iteration and/or for each additional source array (and corresponding iterations).

Figure 5B:
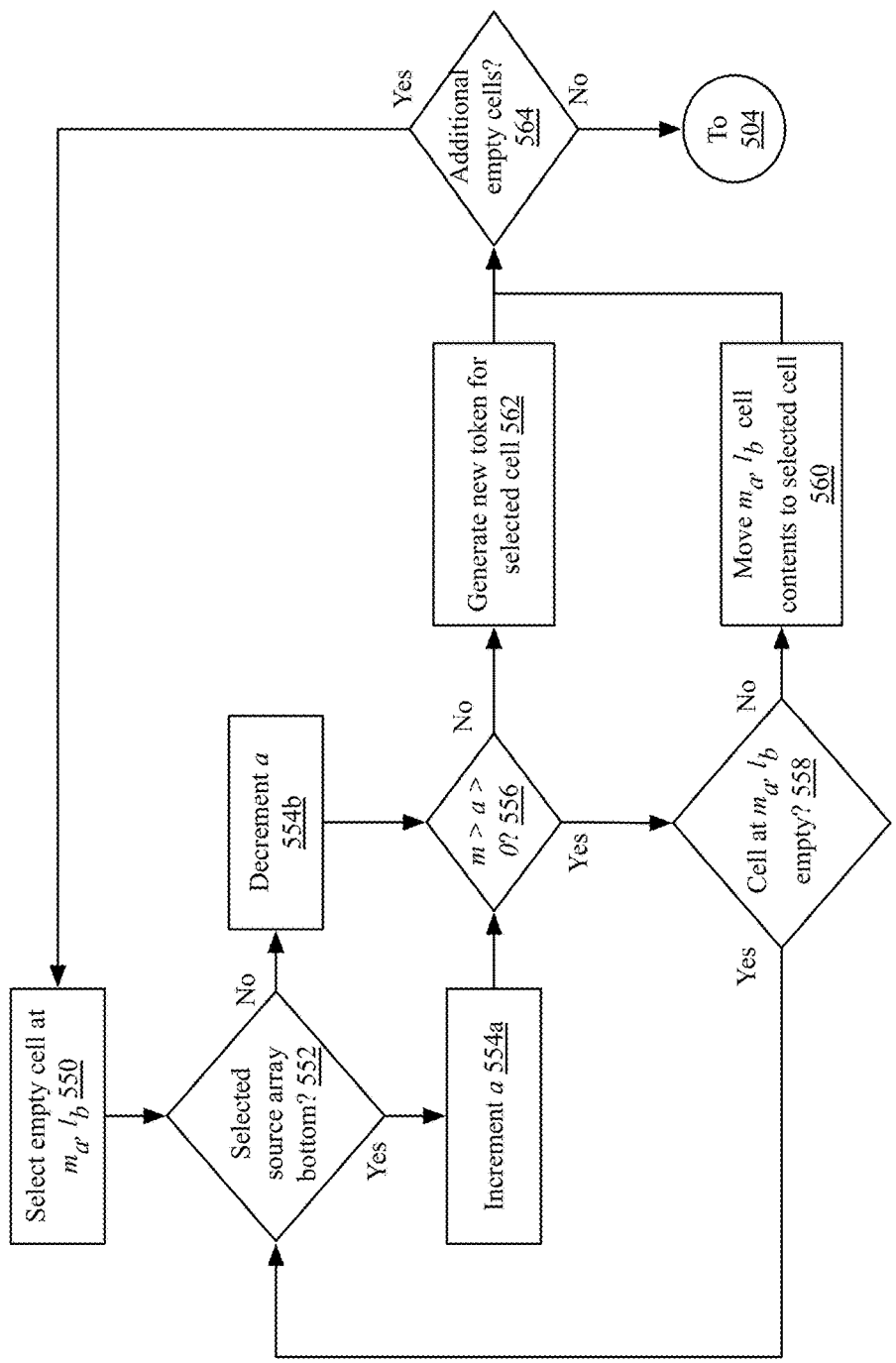

FIG. 5B is a flow chart illustrating an implementation of step 502 of FIG. 5A. In one implementation, at step 550, an empty cell in the target array is identified, such as a cell at $m_a$, $l_b$. The array processor may identify a position or association of the presently selected source array at step 522, which may be the source array from which a token was last selected to replace a token within the target array. If the source array is associated with the bottom of the target array, then at step 554a, the processor may increment the value of a; if the source array is associated with the top of the target array, then at step 554b, the processor may decrement the value of a.

At step 556, the processor may determine if a is between 0 and m—that is, given the incremented or decremented a, whether the new cell $m_a$, $l_b$ is within the boundaries of the target array having rows 0-m. If so, then at step 558, the array processor may determine if the cell at the new $m_a$, $l_b$ is empty. If it is, then steps 552-558 may be repeated. If the cell is not empty, at step 560, the token in the cell at the new $m_a$, $l_b$ may be moved to the cell at the previous $m_a$, $l_b$ (e.g. from $m_{a+1}$, $l_b$ to $m_a$, $l_b$, or from $m_{a-1}$, $l_b$ to $m_a$, $l_b$, depending on whether a was incremented or decremented at step 554a-554b). Conversely, if a is not between 0 and m, then the empty cell is at the border of the target array. Accordingly, at step 562, the token generator may generate a new token for the selected empty cell.

At step 556, the array processor may determine if there are additional empty cells. If so, steps 550-564 may be iteratively repeated until no empty cells remain. Then, the method 500 of FIG. 5A may continue at step 504.

Although discussed primarily in terms of the source array being associated with the top or bottom border of the target array, in some implementations, the source array may be associated with a left or right border of the target array. In such implementations, the processor may instead increment or decrement b at steps 554a-554b; determine if b is between 1 and 0 at step 556, and similarly generate or move tokens.

Accordingly, the systems and methods discussed herein provide for processing of token replacements within a target array from one or more source arrays, with dynamic shifting of tokens based on associations between each source array and a border of the target array. Such systems may be used for various signal or packet processing methods. For example, given a plurality of queues for processing network packets or other data, each cell in a target array corresponding to a queued packet or data segment, packets or data may be selected for processing based on similarity to other data or packets in a source array: a plurality of packets or data of a similar type, corresponding to a region of adjacent identical tokens within the target array, may be selected for processing based on a newly arrived packet or data in a source array. This may be useful when processing of the similar packets requires instantiation of a processing thread or servlet, and may provide efficient selection, queueing, and processing of packets.

In other implementations, these systems may be used for a puzzle or token matching game, such as a "match-3 game," in which a field or array of icons or tokens are provided to the user. In one common implementation, the user may select a token to swap with an adjacent token in the array. If, after swapping, three or more identical tokens are adjacent in the array, the identical tokens are removed, a user score is incremented, and the resulting empty spots in the array are filled. Once the initial board or field is filled, typical match-3 games only introduce any randomness when empty spots in the array are filled. In fact, one subset of these games does not introduce any further randomness, and instead have emptying the field through matches to leave the fewest number of remaining tokens as the object of the game. Accordingly, these games may rely more on strategy and long-term planning than luck, which is not preferred by all users.

To provide additional randomness and luck into game play while still allowing for strategy and planning, the systems and methods discussed herein provide an improved match game with a first array of tokens that may be used to replace corresponding tokens in a second array to create a region of adjacent identical tokens for scoring purposes. An m×l array of randomly selected tokens may be provided as a playing field, and a second n×l array of randomly selected tokens may be provided as a hand. The user may select a cell within the m×l array to replace the token in said cell with a token in a corresponding cell of the n×l array. If the replacement results in a region of adjacent identical tokens in the m×l array, the tokens may be removed and the user's score incremented. If no plays are possible from the user's hand, the user may draw a new hand of randomly selected tokens to replace the tokens and/or blank spaces in the n×l array. Play continues until the user has exhausted a predetermined number of opportunities to draw a new hand. Multiple source arrays may be used for multiple players with a single target array, either locally or via network play, or for a computer player, with tokens shifted in different directions according to the relative positioning of users or association of source arrays with the target array.

In one aspect, the present disclosure is directed to a method for processing replacements to a target array by a plurality of source arrays. The method includes detecting an interaction of a first user, via an input device of a computing device, with a first cell within an m×l array of randomly selected tokens, the first cell including a first token, each cell within the m×l array corresponding to a single cell in a first n×l array of randomly selected tokens and a single cell in a second n×l array of randomly selected tokens. The method also includes identifying, by a rules engine executed by the computing device, a second token in the single cell of the first n×l array corresponding to the first cell within the m×l array. The method also includes determining, by the rules engine, that the second token is identical to tokens in at least two cells adjacent to the first cell in the m×l array. The method further includes, responsive to the determination, removing, by the rules engine, the second token from the first n×l array, the first token from the m×l array, and the tokens in the at least two cells adjacent to the first cell in the m×l array that are identical to the second token. The method also includes iteratively shifting a token in the m×l array into an adjacent cell not including a token in a direction toward the first n×l array until at least one cell at the edge of the m×l array does not include a token; and providing, by the token generator, at least one new token for the corresponding at least one cell.

In some implementations, the method includes detecting an interaction of a second user with a second cell within the m×l array of randomly selected tokens. The method also includes identifying, by the rules engine, a third token in the single cell of the second n×l array corresponding to the second cell within the m×l array; and determining, by the rules engine, that the third token is identical to tokens in at least two cells adjacent to the second cell in the m×l array. The method further includes, responsive to the determination, removing, by the rules engine, the third token from the second n×l array, the second token from the m×l array, and the tokens in the at least two cells adjacent to the second cell in the m×l array that are identical to the third token. In a further implementation, the method includes iteratively shifting a token in the m×l array into an adjacent cell not including a token in a second direction toward the second n×l array until at least one cell at the edge of the m×l array does not include a token; and providing, by the token generator, at least one new token for the corresponding at least one cell. In a still further implementation, the direction toward the first n×l array is opposite the second direction toward the second n×l array. In another further implementation, detecting the interaction of the second user comprises detecting the interaction of the second user with the input device of the computing device. In yet another further implementation, detecting the interaction of the second user comprises receiving an identification of the interaction via network interface of the computing device from a second computing device. In still yet another further implementation, the method includes identifying, by the rules engine, that no replacement of a third token in a cell within the m×l array with a fourth token from a corresponding cell of the first n×l array results in a region of adjacent identical tokens within the m×l array; and detecting the interaction of the second user with the second cell within the m×l array of randomly selected tokens is performed responsive to the identification. In an even further implementation, the method includes replacing, by the token generator, the first n×l array with a third n×l array of randomly selected tokens, responsive to the identification. In a yet even further implementation, the method includes replacing the first n×l array with the third n×l array of randomly selected tokens by: providing an interface element to the first user; receiving a selection of the interface element by the first user; and replacing the first n×l array with the third n×l array of randomly selected tokens, responsive to the selection of the interface element by the user. In a still further implementation, the method includes decrementing an iteration counter.

In another aspect, the present disclosure is directed to a system for processing replacements to a target array by a plurality of source arrays. The system includes a computing device comprising a processor executing a token generator and a rules engine; a memory device storing an m×l array of randomly selected tokens, a first n×l array of randomly selected tokens, and a second n×l array of randomly selected tokens; and an input device. The input device is configured for detecting an interaction of a first user with a first cell within the m×l array of randomly selected tokens, the first cell including a first token, each cell within the m×l array corresponding to a single cell in a first n×l array of randomly selected tokens and a single cell in a second n×l array of randomly selected tokens. The rules engine is configured to: identify a second token in the single cell of the first n×l array corresponding to the first cell within the m×l array; determine that the second token is identical to tokens in at least two cells adjacent to the first cell in the m×l array; responsive to the determination, remove the second token from the first n×l array, the first token from the m×l array, and the tokens in the at least two cells adjacent to the first cell in the m×l array that are identical to the second token; and iteratively shift a token in the m×l array into an adjacent cell not including a token in a direction toward the first n×l array until at least one cell at the edge of the m×l array does not include a token. The token generator is configured to provide at least one new token for the corresponding at least one cell.

In some implementations, the processor is configured to detect an interaction of a second user with a second cell within the m×l array of randomly selected tokens. The rules engine is further configured to: identify a third token in the single cell of the second n×l array corresponding to the second cell within the m×l array; determine that the third token is identical to tokens in at least two cells adjacent to the second cell in the m×l array; and responsive to the determination, remove the third token from the second n×l array, the second token from the m×l array, and the tokens in the at least two cells adjacent to the second cell in the m×l array that are identical to the third token. In a further implementation, the rules engine is further configured to iteratively shift a token in the m×l array into an adjacent cell not including a token in a second direction toward the second n×l array until at least one cell at the edge of the m×l array does not include a token; and the token generator is further configured to provide at least one new token for the corresponding at least one cell. In a still further implementation, the direction toward the first n×l array is opposite the second direction toward the second n×l array. In another further implementation, the input device is further configured to detect the interaction of the second user. In yet another further implementation, the computing device further comprises a network interface, in communication with a second computing device, configured to receive an identification of the interaction from the second computing device. In another further implementation, the rules engine is further configured to: identify that no replacement of a third token in a cell within the m×l array with a fourth token from a corresponding cell of the first n×l array results in a region of adjacent identical tokens within the m×l array; and detecting the interaction of the second user with the second cell within the m×l array of randomly selected tokens is performed responsive to the identification. In a still further implementation, the token generator is further configured to replace the first n×l array with a third n×l array of randomly selected tokens, responsive to the identification. In a yet still further implementation, the processor is configured to provide an interface element to the first user; and the input device is further configured to receive a selection of the interface element by the first user; and the token generator is configured to replace the first n×l array with the third n×l array of randomly selected tokens, responsive to the selection of the interface element by the user. In a still further implementation, the memory device stores an iteration counter, and the processor is further configured to decrement the iteration counter.

While the invention is particularly shown and described with reference to specific embodiments, it should be understood by those skilled in the art that various changes in form and detail may be made therein without departing from the spirit and scope of the invention described in this disclosure.

What is claimed:

1. A method for processing replacements to a target array by a plurality of source arrays, comprising:
    detecting an interaction of a first user, via an input device of a computing device, with a first cell within an m×l array of randomly selected tokens, the first cell including a first token, each cell within the m×l array corresponding to a single cell in a first n×l array of randomly selected tokens and a single cell in a second n×l array of randomly selected tokens;
    identifying, by a rules engine executed by the computing device, a second token in the single cell of the first n×l array corresponding to the first cell within the m×l array;
    determining, by the rules engine, that the second token is identical to tokens in at least two cells adjacent to the first cell in the m×l array;
    responsive to the determination, removing, by the rules engine, the second token from the first n×l array, the first token from the m×l array, and the tokens in the at least two cells adjacent to the first cell in the m×l array that are identical to the second token;
    iteratively shifting a token in the m×l array into an adjacent cell not including a token in a direction toward the first n×l array until at least one cell at the edge of the m×l array does not include a token; and
    providing, by the token generator, at least one new token for the corresponding at least one cell.

2. The method of claim 1, further comprising:
    detecting an interaction of a second user with a second cell within the m×l array of randomly selected tokens;
    identifying, by the rules engine, a third token in the single cell of the second n×l array corresponding to the second cell within the m×l array;
    determining, by the rules engine, that the third token is identical to tokens in at least two cells adjacent to the second cell in the m×l array; and
    responsive to the determination, removing, by the rules engine, the third token from the second n×l array, the second token from the m×l array, and the tokens in the at least two cells adjacent to the second cell in the m×l array that are identical to the third token.

3. The method of claim 2, further comprising:
    iteratively shifting a token in the m×l array into an adjacent cell not including a token in a second direction toward the second n×l array until at least one cell at the edge of the m×l array does not include a token; and
    providing, by the token generator, at least one new token for the corresponding at least one cell.

4. The method of claim 3, wherein the direction toward the first n×l array is opposite the second direction toward the second n×l array.

5. The method of claim 2, wherein detecting the interaction of the second user comprises detecting the interaction of the second user with the input device of the computing device.

6. The method of claim 2, wherein detecting the interaction of the second user comprises receiving an identification of the interaction via network interface of the computing device from a second computing device.

7. The method of claim 2, further comprising:
    identifying, by the rules engine, that no replacement of a third token in a cell within the m×l array with a fourth token from a corresponding cell of the first n×l array results in a region of adjacent identical tokens within the m×l array; and
    wherein detecting the interaction of the second user with the second cell within the m×l array of randomly selected tokens is performed responsive to the identification.

8. The method of claim 7, further comprising:
    replacing, by the token generator, the first n×l array with a third n×l array of randomly selected tokens, responsive to the identification.

9. The method of claim 8, wherein replacing the first n×l array with the third n×l array of randomly selected tokens further comprises:
    providing an interface element to the first user;
    receiving a selection of the interface element by the first user; and
    replacing the first n×l array with the third n×l array of randomly selected tokens, responsive to the selection of the interface element by the user.

10. The method of claim 9, further comprising decrementing an iteration counter.

11. A system for processing replacements to a target array by a plurality of source arrays, comprising:
    a computing device comprising a processor executing a token generator and a rules engine; a memory device storing an m×l array of randomly selected tokens, a first n×l array of randomly selected tokens, and a second n×l array of randomly selected tokens; and an input device;
    wherein the input device is configured for detecting an interaction of a first user with a first cell within the m×l array of randomly selected tokens, the first cell including a first token, each cell within the m×l array corresponding to a single cell in a first n×l array of randomly selected tokens and a single cell in a second n×l array of randomly selected tokens;
    wherein the rules engine is configured to:
        identify a second token in the single cell of the first n×l array corresponding to the first cell within the m×l array,
        determine that the second token is identical to tokens in at least two cells adjacent to the first cell in the m×l array,
        responsive to the determination, remove the second token from the first n×l array, the first token from the m×l array, and the tokens in the at least two cells adjacent to the first cell in the m×l array that are identical to the second token, and
        iteratively shift a token in the m×l array into an adjacent cell not including a token in a direction toward the first n×l array until at least one cell at the edge of the m×l array does not include a token; and
    wherein the token generator is configured to provide at least one new token for the corresponding at least one cell.

12. The system of claim 11,
    wherein the processor is configured to detect an interaction of a second user with a second cell within the m×l array of randomly selected tokens; and
    wherein the rules engine is further configured to:
        identify a third token in the single cell of the second n×l array corresponding to the second cell within the m×l array,
        determine that the third token is identical to tokens in at least two cells adjacent to the second cell in the m×l array, and
        responsive to the determination, remove the third token from the second n×l array, the second token from the m×l array, and the tokens in the at least two cells adjacent to the second cell in the m×l array that are identical to the third token.

13. The system of claim 12, wherein the rules engine is further configured to iteratively shift a token in the m×l array into an adjacent cell not including a token in a second direction toward the second n×l array until at least one cell at the edge of the m×l array does not include a token; and
    wherein the token generator is further configured to provide at least one new token for the corresponding at least one cell.

14. The system of claim 13, wherein the direction toward the first n×l array is opposite the second direction toward the second n×l array.

15. The system of claim 12, wherein the input device is further configured to detect the interaction of the second user.

16. The system of claim 12, wherein the computing device further comprises a network interface in communication with a second computing device, the network interface configured to receive an identification of the interaction from the second computing device.

17. The system of claim 12, wherein the rules engine is further configured to:
    identify that no replacement of a third token in a cell within the m×l array with a fourth token from a corresponding cell of the first n×l array results in a region of adjacent identical tokens within the m×l array; and
    wherein detecting the interaction of the second user with the second cell within the m×l array of randomly selected tokens is performed responsive to the identification.

18. The system of claim 17, wherein the token generator is further configured to replace the first n×l array with a third n×l array of randomly selected tokens, responsive to the identification.

19. The system of claim 18, wherein the processor is configured to provide an interface element to the first user;
    wherein the input device is further configured to receive a selection of the interface element by the first user; and
    wherein the token generator is configured to replace the first n×l array with the third n×l array of randomly selected tokens, responsive to the selection of the interface element by the user.

20. The system of claim 19, wherein the memory device stores an iteration counter, and wherein the processor is further configured to decrement the iteration counter.

\* \* \* \* \*